US011065852B2

(12) United States Patent
Fujimoto et al.

(10) Patent No.: US 11,065,852 B2
(45) Date of Patent: Jul. 20, 2021

(54) ADHESIVE FILM

(71) Applicant: RIKEN TECHNOS CORPORATION, Tokyo (JP)

(72) Inventors: Jun Fujimoto, Tokyo (JP); Nozomu Washio, Tokyo (JP); Taketo Hashimoto, Tokyo (JP)

(73) Assignee: RIKEN TECHNOS CORPORATION

(*) Notice: Subject to any disclaimer, the term of this patent is extended or adjusted under 35 U.S.C. 154(b) by 0 days.

(21) Appl. No.: 15/559,240

(22) PCT Filed: Feb. 1, 2016

(86) PCT No.: PCT/JP2016/052927
§ 371 (c)(1),
(2) Date: Sep. 18, 2017

(87) PCT Pub. No.: WO2016/147716
PCT Pub. Date: Sep. 22, 2016

(65) Prior Publication Data
US 2018/0072030 A1 Mar. 15, 2018

(30) Foreign Application Priority Data

Mar. 18, 2015 (JP) .................. 2015-054437
Jul. 7, 2015 (JP) ............. JP2015-135756

(51) Int. Cl.
*B32B 27/20* (2006.01)
*B32B 27/30* (2006.01)
(Continued)

(52) U.S. Cl.
CPC ............. *B32B 27/20* (2013.01); *B29C 48/21* (2019.02); *B32B 7/02* (2013.01); *B32B 7/04* (2013.01);
(Continued)

(58) Field of Classification Search
CPC .................. B32B 2307/412; B32B 27/20
See application file for complete search history.

(56) References Cited

U.S. PATENT DOCUMENTS 3,496,143 A 2/1970 Siggel et al.
6,055,823 A 5/2000 Baker et al.
(Continued)

FOREIGN PATENT DOCUMENTS

CN 1649733 A 8/2005
CN 102686642 A 9/2012
(Continued)

OTHER PUBLICATIONS

Machine translation JP 2015-016683 (Year: 2015).*
(Continued)

*Primary Examiner* — Alexandre F Ferre
(74) *Attorney, Agent, or Firm* — Bracewell LLP; Brad Y. Chin

(57) ABSTRACT

An embodiment provides an adhesive film having, in order from the surface layer side, a first hard coat, a second hard coat, a transparent resin film layer, and an adhesive layer. The first hard coat is formed from a coating that does not include inorganic particles. The second hard coat is formed from a coating that includes inorganic particles. The adhesive film satisfies the following conditions: (i) the total light transmittance is at least 85%; and (vii) the pencil hardness of the first hard coat surface is at least 5H. Another embodiment provides an adhesive film having, in order from the surface layer side, a first hard coat, a second hard coat, a transparent resin film layer, and an adhesive layer. The first hard coat is formed from a coating that does not include inorganic particles. The second hard coat is formed from a coating that includes inorganic particles. The adhesive film satisfies the following conditions: (i) the total light transmittance is at least 85%; and (iv) the water contact angle at the
(Continued)

first hard coat surface is at least 100 degrees; and (v) the water contact angle at the first hard coat surface after 20,000 reciprocal cotton rubs is at least 100 degrees.

20 Claims, 2 Drawing Sheets

(51) Int. Cl.
| | |
|---|---|
| B32B 7/12 | (2006.01) |
| B32B 38/00 | (2006.01) |
| B32B 27/06 | (2006.01) |
| B29C 48/21 | (2019.01) |
| B32B 23/18 | (2006.01) |
| B32B 27/16 | (2006.01) |
| B32B 27/40 | (2006.01) |
| B32B 7/02 | (2019.01) |
| B32B 27/32 | (2006.01) |
| B32B 7/04 | (2019.01) |
| B32B 23/08 | (2006.01) |
| B32B 27/36 | (2006.01) |
| B32B 23/04 | (2006.01) |
| B32B 27/08 | (2006.01) |
| B32B 27/34 | (2006.01) |
| B32B 27/28 | (2006.01) |
| C09D 7/40 | (2018.01) |

(52) U.S. Cl.
CPC .............. *B32B 7/12* (2013.01); *B32B 23/04* (2013.01); *B32B 23/08* (2013.01); *B32B 23/18* (2013.01); *B32B 27/06* (2013.01); *B32B 27/08* (2013.01); *B32B 27/16* (2013.01); *B32B 27/28* (2013.01); *B32B 27/281* (2013.01); *B32B 27/30* (2013.01); *B32B 27/308* (2013.01); *B32B 27/32* (2013.01); *B32B 27/325* (2013.01); *B32B 27/34* (2013.01); *B32B 27/36* (2013.01); *B32B 27/365* (2013.01); *B32B 27/40* (2013.01); *B32B 38/0004* (2013.01); *B32B 38/0008* (2013.01); *C09D 7/40* (2018.01); *B32B 2250/03* (2013.01); *B32B 2255/10* (2013.01); *B32B 2255/26* (2013.01); *B32B 2255/28* (2013.01); *B32B 2270/00* (2013.01); *B32B 2307/21* (2013.01); *B32B 2307/306* (2013.01); *B32B 2307/308* (2013.01); *B32B 2307/4026* (2013.01); *B32B 2307/412* (2013.01); *B32B 2307/516* (2013.01); *B32B 2307/518* (2013.01); *B32B 2307/536* (2013.01); *B32B 2307/546* (2013.01); *B32B 2307/554* (2013.01); *B32B 2307/558* (2013.01); *B32B 2307/58* (2013.01); *B32B 2307/71* (2013.01); *B32B 2307/712* (2013.01); *B32B 2307/732* (2013.01); *B32B 2307/734* (2013.01); *B32B 2405/00* (2013.01); *B32B 2457/20* (2013.01); *B32B 2457/202* (2013.01); *B32B 2457/204* (2013.01); *B32B 2457/208* (2013.01); *G06F 2203/04103* (2013.01)

(56) References Cited

U.S. PATENT DOCUMENTS

| | | | |
|---|---|---|---|
| 6,489,015 B1 | 12/2002 | Tsuchiya et al. | |
| 10,596,739 B2 | 3/2020 | Washio et al. | |
| 2003/0022984 A1 | 1/2003 | Kawase et al. | |
| 2003/0022987 A1 | 1/2003 | Kawase et al. | |
| 2005/0249942 A1 | 11/2005 | Coggio et al. | |
| 2006/0134400 A1* | 6/2006 | Takada | C08G 18/672 428/313.9 |
| 2006/0210727 A1 | 9/2006 | Ibuki et al. | |
| 2007/0231566 A1* | 10/2007 | Yoneyama | G02B 1/105 428/331 |
| 2007/0291363 A1 | 12/2007 | Asakura et al. | |
| 2010/0147191 A1* | 6/2010 | Sakano | C07F 7/21 106/287.11 |
| 2010/0210812 A1 | 8/2010 | Urakawa et al. | |
| 2012/0114892 A1 | 5/2012 | Jung et al. | |
| 2013/0059158 A1 | 3/2013 | Oguro et al. | |
| 2013/0084458 A1 | 4/2013 | Yamada et al. | |
| 2013/0216801 A1 | 8/2013 | Kadoki et al. | |
| 2013/0222906 A1 | 8/2013 | Tsunekawa et al. | |
| 2014/0044891 A1 | 2/2014 | Shibata et al. | |
| 2014/0208657 A1 | 7/2014 | Kim et al. | |
| 2014/0227482 A1 | 8/2014 | Shibata et al. | |
| 2014/0360975 A1 | 12/2014 | Hustad et al. | |
| 2015/0203711 A1 | 7/2015 | Kang et al. | |
| 2016/0122525 A1 | 5/2016 | Carloff et al. | |
| 2016/0122573 A1* | 5/2016 | Uprety | C08J 7/045 428/217 |
| 2016/0214294 A1 | 7/2016 | Tsujimura et al. | |
| 2016/0229159 A1 | 8/2016 | Nakashima et al. | |
| 2017/0095993 A1 | 4/2017 | Tomomatsu et al. | |
| 2017/0183543 A1 | 6/2017 | Nagata et al. | |
| 2017/0198164 A1 | 7/2017 | Itagaki et al. | |
| 2018/0072029 A1 | 3/2018 | Nakashima et al. | |

FOREIGN PATENT DOCUMENTS

| | | | |
|---|---|---|---|
| CN | 103492913 A | | 1/2014 |
| CN | 104422239 A | | 3/2015 |
| CN | 105404094 A | | 3/2016 |
| EP | 2873692 A1 | | 5/2015 |
| JP | S633011 A | | 1/1988 |
| JP | H0211665 A | | 1/1990 |
| JP | H0419142 A | | 1/1992 |
| JP | H0794061 A | | 4/1995 |
| JP | 2000052472 A | | 2/2000 |
| JP | 2000214791 A | | 8/2000 |
| JP | 2000214791 A | * | 8/2000 |
| JP | 2000517455 A | | 12/2000 |
| JP | 2002062405 A | | 2/2002 |
| JP | 2004109966 A | | 4/2004 |
| JP | 2005148444 A | | 6/2005 |
| JP | 2005181940 A | | 7/2005 |
| JP | 2006030983 A | | 2/2006 |
| JP | 2006058574 A | | 3/2006 |
| JP | 2006154758 A | | 6/2006 |
| JP | 2006215488 A | | 8/2006 |
| JP | 2007108449 A | | 4/2007 |
| JP | 2007537059 A | | 12/2007 |
| JP | 2008026883 A | | 2/2008 |
| JP | 2008095064 A | | 4/2008 |
| JP | 2008201864 A | | 9/2008 |
| JP | 2008538195 A | | 10/2008 |
| JP | 2009036818 A | | 2/2009 |
| JP | 2009114248 A | | 5/2009 |
| JP | 2009196125 A | | 9/2009 |
| JP | 2009279806 A | | 12/2009 |
| JP | 2010064332 A | | 2/2010 |
| JP | 2010054861 A | | 3/2010 |
| JP | 2010064332 A | | 3/2010 |
| JP | 2010078642 A | | 4/2010 |
| JP | 2010511206 A | | 4/2010 |
| JP | 2010131771 A | | 6/2010 |
| JP | 2010208035 A | | 9/2010 |
| JP | 2010211150 A | | 9/2010 |
| JP | 2010224150 A | | 10/2010 |
| JP | 2010241019 A | | 10/2010 |
| JP | 2010271400 A | | 12/2010 |
| JP | 2010275385 A | | 12/2010 |
| JP | 2011133862 A | | 7/2011 |
| JP | 2011175040 A | | 9/2011 |
| JP | 2011201087 A | | 10/2011 |
| JP | 2011213989 A | | 10/2011 |
| JP | 2012111943 A | | 6/2012 |

(56) References Cited

FOREIGN PATENT DOCUMENTS

| | | | |
|---|---|---|---|
| JP | 2012234163 A | 11/2012 | |
| JP | 2012250438 A | 12/2012 | |
| JP | 2013075466 A | 4/2013 | |
| JP | 2013076029 A | 4/2013 | |
| JP | 2013142113 A | 7/2013 | |
| JP | 2013173871 A | 9/2013 | |
| JP | 201431397 A | 2/2014 | |
| JP | 2014024332 A | 2/2014 | |
| JP | 2014025061 A | 2/2014 | |
| JP | 2014040017 A | 3/2014 | |
| JP | 2014043101 A | 3/2014 | |
| JP | 2014080536 A | 5/2014 | |
| JP | 2014117904 A | 6/2014 | |
| JP | 2014143831 A | 8/2014 | |
| JP | 2014152237 A | 8/2014 | |
| JP | 2014152281 A | 8/2014 | |
| JP | 2014201681 A | 10/2014 | |
| JP | 2014238614 A | 12/2014 | |
| JP | 2015013472 A | 1/2015 | |
| JP | 2015013473 A | 1/2015 | |
| JP | 2015016683 A | 1/2015 | |
| JP | 2015033851 A | 2/2015 | |
| JP | 2015034285 A | 2/2015 | |
| JP | 2015034286 A | 2/2015 | |
| JP | 2015083370 A | 4/2015 | |
| JP | 2015151420 A | 8/2015 | |
| JP | 2015182272 A | 10/2015 | |
| JP | 2015182273 A | 10/2015 | |
| JP | 2015203770 A | 11/2015 | |
| JP | 2016006160 A | 1/2016 | |
| JP | 2016011365 A | 1/2016 | |
| JP | 5870222 B1 | 2/2016 | |
| JP | 5878255 A | 3/2016 | |
| JP | 2016060839 A | 4/2016 | |
| JP | 2016172423 A | 9/2016 | |
| JP | 2016172424 A | 9/2016 | |
| JP | WO2015098495 A1 | 3/2017 | |
| JP | 2017200042 A | 11/2017 | |
| KR | 1020040094153 A | 11/2001 | |
| KR | 20100129512 A | 12/2010 | |
| KR | 20140056399 A | 5/2014 | |
| KR | 10-2013-0058565 A | 12/2014 | |
| TW | 200609110 A | 3/2006 | |
| TW | 201300236 A | 1/2013 | |
| TW | 201420652 A | 6/2014 | |
| TW | 201437304 A | 10/2014 | |
| TW | 201504320 A | 2/2015 | |
| TW | 201602268 A | 1/2016 | |
| TW | 201638250 A | 11/2016 | |
| WO | 2005113690 A2 | 12/2005 | |
| WO | 2006102383 A1 | 9/2006 | |
| WO | 2008029766 A1 | 3/2008 | |
| WO | 2008067262 A1 | 6/2008 | |
| WO | 2011033976 A1 | 3/2011 | |
| WO | 2011034847 A1 | 3/2011 | |
| WO | 2011145630 A1 | 11/2011 | |
| WO | 2012026446 A1 | 3/2012 | |
| WO | 2012144508 A1 | 10/2012 | |
| WO | 2012144510 A1 | 10/2012 | |
| WO | 2013129531 A1 | 9/2013 | |
| WO | 2014030848 A1 | 2/2014 | |
| WO | 2014203792 A1 | 12/2014 | |
| WO | 2015001948 A1 | 1/2015 | |
| WO | 2015005049 A | 1/2015 | |
| WO | 2015005049 A1 | 1/2015 | |
| WO | 2015045823 A1 | 4/2015 | |
| WO | 2015098495 A1 | 7/2015 | |
| WO | WO-2015098495 A1 * | 7/2015 | ............. G02B 1/14 |
| WO | 2015146565 A | 10/2015 | |
| WO | 2016147424 A1 | 9/2016 | |
| WO | 2016147734 A1 | 9/2016 | |
| WO | 2016147739 A1 | 9/2016 | |
| WO | 2017200042 A | 11/2017 | |

OTHER PUBLICATIONS

Machine translation JP 2009-279806 (Year: 2009).*
Machine translation JP 2000214791. (Year: 2000).*
Machine translation WO 2015/098495 (Year: 2015).*
CN201680015908.7 Office Action dated Feb. 2, 2019; 12 pgs.
CN201680015902.X Office Action dated Feb. 3, 2019; 15 pgs.
KR10-2016-7017502 Office Action dated Oct. 27, 2017; 18pgs.
CN201680015850.6 Office Action dated Jan. 24, 2019; 10 pgs.
PCT/JP2016/084981 International Search Report dated Jan. 25, 2017; 2 pgs.
EP16764570.4 Search Report dated May 28, 2018; 8 pgs.
Artham, et al., Biodegradation of Aliphatic and Aromatic Polycarbonates, Macromol. Biosci, 2008, 8, 14-24. (Year: 2008).
CN201680015900.0 Office Action dated Nov. 5, 2018; 12 pgs.
PCT/JP2016/084981 International Preliminary Report on Patentability dated Jun. 21, 2018; 13 pgs.
EP16764564.7 Extended European Search Report dated Oct. 18, 2018; 8 pgs.
EP16764565.4 Extended European Search Report dated Oct. 18, 2018; 8 pgs.
JP2017069555 Office Action dated Nov. 27, 2018; 8 pgs.
CN201680015984.8 Office Action dated Nov. 5, 2018; 13 pgs.
EP16764607.4 Search Report dated May 28, 2018; 8 pgs.
CN201580003516.4 Office Action dated Jun. 28, 2017; 22 pgs.
JP2015-054439 Office Action dated Aug. 24, 2016; 31 pgs.
TW104122442 Office Action dated Jul. 13, 2016; 24 pgs.
PCT/JP2016/052927 International Search Report dated Apr. 19, 2016; 2 pgs.
EP15885519.7 Extended European Search Report dated Oct. 18, 2018; 8PGS.
PCT/JP2016/052950 International Search Report dated Apr. 19, 2016; 2 pgs.
PCT/JP2016/053357 International Search Report dated May 17, 2016; 2 pgs.
PCT/JP2016/053355 International Search Report dated May 17, 2016; 2 pgs.
PCT/JP2016/053556 International Search Report dated May 17, 2016; 2 pgs.
PCT/JP2016/054363 International Search Report dated May 17, 2016; 2 pgs.
CN201680015901.5 Office Action dated Jan. 28, 2019; 12 pgs.
KR10-2016-7017502 Decision of Rejection dated May 10, 2018; 8 pgs.
EP16764550.6 Extended European Search Report dated Oct. 18, 2018; 8 pgs.
KR10-2017-7026048 Korean Office Action dated Nov. 1, 2018; 14 pgs.
CN201580003516.4 Office Action dated Jan. 17, 2018; 20 pgs.
Lai, et al., Synthetic Process and Application of Silicone Products, 2nd Edition, Nov. 2009, 4 pgs.
KR10-2019-7001505 Office Action dated Feb. 20, 2019; 12 pgs.
JP6144330 Opposition Paper dated Dec. 5, 2017; 45 Pgs.
Yamamoto, et al.; Application of Chemically Absorbed Fluorocarbon Film with Highly Durability as a Mold Release Agent; Seikei-Kakou vol. 22 No. 2, 2010; pp. 104-114.
PCT/JP2017/027297 International Search Report dated Aug. 29, 2017; 2 pgs.
JP2017-152119 Office Action dated Aug. 7, 2018; 10 pgs.
PCT/JP2017/040099 International Search Report dated Feb. 13, 2018; 4 pgs.
EP16868622.8 Extended European Search Report dated May 20, 2019; 8 pgs.
EP16872835.0 Extended European Search Report dated Jul. 8, 2019; 6 pgs.
TW105104029 Office Action dated Mar. 7, 2019; 12 pgs.
TW105104027 Office Action dated Jun. 25, 2019; 21 pages.
Chinese Patent Application No. 201680015984.8 dated Jun. 4, 2019; 8 pgs.
Chinese Patent Application No. 201680015900.0 dated Jun. 4, 2019; 8 pgs.
CN201680015902.X Second Office Action dated Jul. 17, 2019; 16 pgs.

(56) References Cited

OTHER PUBLICATIONS

JP2017-094366 Office Action dated Nov. 18, 2019, 11 pgs.
TW105104050 Office Action dated Aug. 20, 2019; 12 pgs.
CN201810254960.9 Office Action dated Oct. 11, 2019, 13 pgs.
JP2016-17863 Office Action dated Oct. 8, 2019; 11 pgs.
CN201680068951.X Office Action dated Sep. 29, 2019; 21 pgs.
CN201680015984.8 Office Action dated Sep. 10, 2019, 13 pgs.
TW105104907 Office Action dated Oct. 18, 2019; 10 pages.
TW105104026 Office Action dated Oct. 5, 2019; 10 pgs.
CN201680015900.0 Office Action dated Sep. 10, 2019, 13 pgs.
TW105104240 Office Action dated Oct. 17, 2019, 10 pgs.
EP20150371.1 Extended European Search Report dated Apr. 7, 2020, 8 pgs.
JP2017-094366 Office Action dated May 11, 2020, 15 pgs.
EP17850559.0 Supplementary Search Report dated Mar. 18, 2020, 10 pgs.
EP15885519.7 Third Party Observations dated Jan. 8, 2020, 85 pgs.
EP20150365.3 Extended European Search Report dated Apr. 9, 2020, 8 pgs.
CN201810254960.9 Second Office Action dated Jun. 9, 2020, 11 pgs.
EP17874537.8 Supplementary Search Report dated May 14, 2020, 12 pgs.
EP20150373.7 Extended European Search Report dated Apr. 7, 2020, 9 pgs.
JP2016-24288 Opposition Against JP6599789 dated Jun. 24, 2020, 64 pgs.
Website of Fluorolink@PFPE (including a flurorine-containing water repellent agent "Fluorolink AD 1700"), https://www.solvay.jp/ja/markets-and-products/featured-products/Fluorolink.html, Jan. 7, 2020, 2pgs.
CN201780055888.0 First Office Action dated Jul. 2, 2020, 11 pgs.
CN201811070889.5 Office Action dated Jan. 10, 2020, 15 pgs.
CN201680015902.X Office Action dated Jan. 2, 2020, 16 pgs.
JP2016-29588 Office Action dated Dec. 24, 2019, 7 pgs.
JP2017-552695 Second Office Action dated Dec. 2, 2020, 5 pgs.
CN201910746657.5 First Office Action dated Oct. 27, 2020, 18 pgs.
JP6599789B Notice for Reasons for Revocation dated Sep. 29, 2020, 32 pgs.
CN201811070889.5 Second Office Action dated Aug. 3, 2020, 16 pgs.
CN201780069802.X Second Office Action dated Nov. 25, 2020, 23 pgs.
CN201780069802.X First Office Action dated Jul. 31, 2020, 23 pgs.
TW106125432 First Office Action dated Dec. 28, 2020, 14 pgs.
CN201810254960.9 Third Office Action dated Dec. 30, 2020, 16 pgs.
KR10-2017-7026047 Third Party Observation dated Jan. 11, 2021, 21 pgs.
TW105136889 Second Office Action dated Jan. 7, 2021, 9 pgs.
CN201910756415.4 First Office Action dated Dec. 31, 2020, 9 pgs.
EP20202998.9 Extended European Search Report dated Feb. 1, 2021, 8 pgs.
JP2017-094366 Office Action dated Jan. 26, 2021, 18 pgs.

\* cited by examiner

ADHESIVE FILM

CROSS REFERENCE TO RELATED APPLICATIONS

This application claims the benefit of and priority to PCT/JP2016/052927, filed on Feb. 1, 2016, entitled (translation), "ADHESIVE FILM," which claims the benefit of and priority to Japanese Patent Application Nos. 2015-054437, filed on Mar. 18, 2015, and 2015-135756, filed on Jul. 7, 2015, each of which is hereby incorporated by reference in their entirety into this application.

BACKGROUND

Field

Embodiments relate to a pressure-sensitive adhesive film. More specifically, embodiments relate to a pressure-sensitive adhesive film that is excellent in transparency, color tone, abrasion resistance, surface hardness, and surface appearance, and preferably having excellent bending resistance.

Description of Related Art

In recent years, a touch panel installed on an image display apparatus, such as a liquid crystal display, a plasma display, or an electroluminescence display and capable inputting by touching the touch panel with a finger, a pen, or the like while watching a displayed object, has become popular. For a display face plate of an image display apparatus (including an image display apparatus having a touch panel function and an image display apparatus having no touch panel function), an article using glass as a substrate thereof is used because glass meets required characteristics, such as heat resistance, dimensional stability, high transparency, high surface hardness, and high rigidity. On the other hand, glass has a problem of having low impact resistance and being easily broken. Therefore, it has been proposed to paste various types of films aiming at prevention of breakage and the like of glass on a surface of a display face plate (for example, see JP 2008-095064 A and JP 2010-275385 A). However, abrasion resistance thereof is insufficient.

Furthermore, glass also has disadvantages such as low processability; difficulty in handling; a high specific gravity and a consequent heavy weight; and difficulty in satisfying demand for making a display curved or flexible. Therefore, a material substituted for glass has been studied intensively. Many hard coat laminated films obtained by forming a hard coat having excellent surface hardness and abrasion resistance on a surface of a transparent resin film formed of triacetylcellulose, polyethylene terephthalate, polycarbonate, polymethyl methacrylate, a norbornene polymer, or the like have been proposed (for example, see JP 2000-052472 A and JP 2000-214791 A). However, abrasion resistance thereof is still insufficient.

On the other hand, there is a demand for a hard coat laminated film having a pressure-sensitive adhesive function.

Therefore, there is a need for a hard coat laminated film with adhesive function, having sufficient abrasion resistance and being capable of maintaining a surface characteristic such as finger slidability even after repeated wipes with a handkerchief or the like.

SUMMARY

An object of the various embodiments is to provide a pressure-sensitive adhesive film that is excellent in transparency, color tone, abrasion resistance, surface hardness, and surface appearance, and preferably having excellent bending resistance.

Embodiments provide for the lamination of specific two kinds of hard coats on a surface on a surface layer side of a transparent resin film to achieve the object of the various embodiments.

According to at least one embodiment, there is provided a pressure-sensitive adhesive film including, in order from a surface layer side, a first hard coat, a second hard coat, a transparent resin film layer, and a pressure-sensitive adhesive layer, wherein the first hard coat is formed of a coating containing no inorganic particles, the second hard coat is formed of a coating material containing inorganic particles, and wherein the pressure-sensitive adhesive film satisfies the following requirements (i) and (vii): (i) a total light transmittance of 85% or more; and (vii) a pencil hardness of the first hard coat surface of 5H or more.

According to at least one embodiment, the pencil hardness of the first hard coat surface is 7H or more.

According to at least one embodiment, the pressure-sensitive adhesive film further satisfies the following requirements (iv) and (v): (iv) a water contact angle at the first hard coat surface of 100° or more; and (v) a water contact angle at the first hard coat surface after 20,000 reciprocating wipes with a cotton of 100° or more.

According to another embodiment, there is provided a pressure-sensitive adhesive film including, in order from a surface layer side, a first hard coat, a second hard coat, a transparent resin film layer, and a pressure-sensitive adhesive layer, in which the first hard coat is formed of a coating material containing no inorganic particles, the second hard coat is formed of a coating material containing inorganic particles, and the following requirements (i), (iv), and (v) are satisfied: (i) a total light transmittance of 85% or more; (iv) a water contact angle at the first hard coat surface of 100° or more; and (v) a water contact angle at the first hard coat surface after 20,000 reciprocating wipes with a cotton of 100° or more.

According to another embodiment, there is provided a pressure-sensitive adhesive film including, in order from a surface layer side, a first hard coat, a second hard coat, a transparent resin film layer, and a pressure-sensitive adhesive layer, in which the first hard coat is formed of a coating material including: (A) 100 parts by mass of a polyfunctional (meth)acrylate; (B) 0.01 to 7 parts by mass of a water-repelling agent; and (C) 0.01 to 10 parts by mass of a silane coupling agent, and containing no inorganic particles, and the second hard coat is formed of a coating material including: (A) 100 parts by mass of the polyfunctional (meth)acrylate; and (D) 50 to 300 parts by mass of inorganic fine particles having an average particle size of 1 to 300 nm.

According to at least one embodiment, the (C) silane coupling agent includes one or more selected from the group consisting of a silane coupling agent having an amino group and a silane coupling agent having a mercapto group.

According to at least one embodiment, the (B) water-repelling agent includes a (meth)acryloyl group-containing fluoropolyether water-repelling agent.

According to at least one embodiment, the second hard coat forming coating material further includes 0.01 to 1 part by mass of (E) a leveling agent.

According to at least one embodiment, the first hard coat has a thickness of from 0.5 to 5 μm.

According to at least one embodiment, the second hard coat has a thickness of from 10 to 30 μm.

According to at least one embodiment, the transparent resin film is a transparent multilayer film obtained by laminating a first poly(meth)acrylimide resin layer ($\alpha 1$), an aromatic polycarbonate resin layer ($\beta$), and a second poly (meth)acrylimide resin layer ($\alpha 2$) directly in this order.

According to at least one embodiment, the pressure-sensitive adhesive layer includes a silicone pressure-sensitive adhesive.

According to another embodiment, there is provided use of the pressure-sensitive adhesive film described above as an image display apparatus member.

According to another embodiment, there is provided an image display apparatus including the pressure-sensitive adhesive film described above.

Embodiments provide non-obvious advantages over the conventional art. For example, embodiments provide a pressure-sensitive adhesive film that is excellent in transparency, color tone, abrasion resistance, surface hardness, and surface appearance. A preferable adhesive film according to at least one embodiment exhibits no bubble entrainment, and has good appearance sustainability at peeling and good adhesiveness. Therefore, the preferable adhesive film according to at least one embodiment can be suitably used as a protective film for a display face plate. In addition, the preferable adhesive film according to at least one embodiment can be suitably used as a member of an image display apparatus, such as a liquid crystal display, a plasma display, or an electroluminescence display (including an image display apparatus having a touch panel function and an image display apparatus having no touch panel function), particularly as a display face plate of an image display apparatus having a touch panel function.

DETAILED DESCRIPTION

Figure 1:
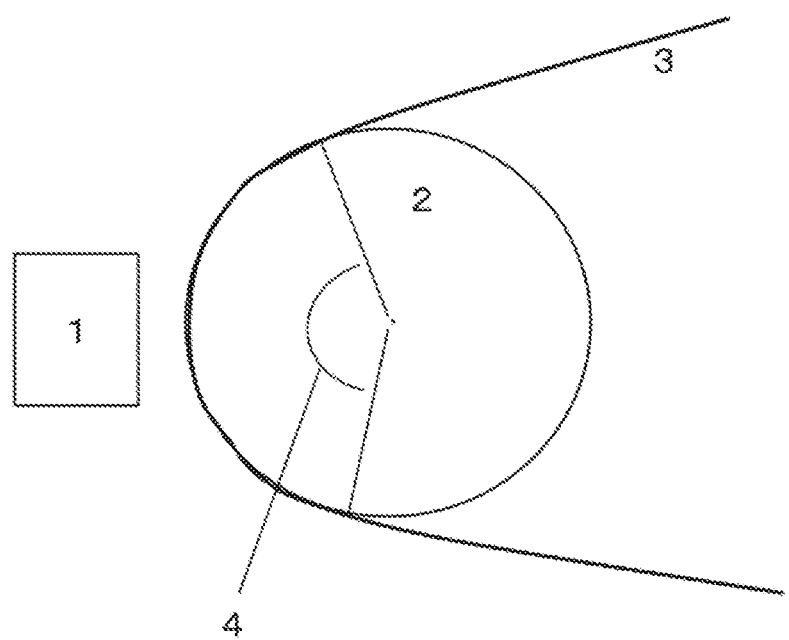
FIG. 1 is a conceptual diagram of an ultraviolet irradiator used in Examples.

According to at least one embodiment, there is provided a pressure-sensitive adhesive film which includes, in order from a surface layer side, a first hard coat, a second hard coat, a transparent resin film layer, and a pressure-sensitive adhesive layer.

Here, the term "surface layer side" means a side closer to an outer surface (a visible surface in a case of a display face plate or a protective film thereof) when an article formed of a pressure-sensitive adhesive film having a multilayer structure is used on site. In addition, herein, disposing one layer on a "surface layer side" of another layer includes that these layers are in direct contact with each other and that another single layer or a plurality of other layers is interposed therebetween.

First Hard Coat

According to at least one embodiment, the first hard coat usually forms a surface of the pressure-sensitive adhesive film. The first hard coat can form a touch surface when the pressure-sensitive adhesive film according to at least one embodiment is used as a display face plate protective film or a display face plate of an image display apparatus having a touch panel function. The first hard coat exhibits good abrasion resistance, and maintains a surface characteristic such as finger slidability even after repeated wipes with a handkerchief or the like.

According to at least one embodiment, the first hard coat is formed of a coating material containing no inorganic particles. The first hard coat is preferably formed of a coating material including 100 parts by mass of a polyfunctional (meth)acrylate (A), 0.01 to 7 parts by mass of a water-repelling agent (B), and 0.01 to 10 parts by mass of a silane coupling agent (C), and containing no inorganic particles.

The term "inorganic particles" referred to herein means particles not containing particles formed of an organic substance (a substance which can generate water and carbon dioxide by combustion).

The inorganic particles (for example, silica (silicon dioxide); metal oxide particles of aluminum oxide, zirconia, titania, zinc oxide, germanium oxide, indium oxide, tin oxide, indium tin oxide, antimony oxide, cerium oxide, or the like; metal fluoride particles of magnesium fluoride, sodium fluoride, or the like; metal sulfide particles; metal nitride particles; and metal particles) are highly effective in enhancing hardness of a hard coat. On the other hand, a weak interaction between the inorganic particles and a resin component, such as component (A) results in insufficient abrasion resistance. Therefore, the various embodiments allow the first hard coat usually constituting an outermost surface to contain no inorganic particles for retaining abrasion resistance. On the other hand, the various embodiments allow the second hard coat to preferably contain a specific amount of inorganic particles having an average particle size of 1 to 300 nm for enhancing hardness, and has thereby solved this problem.

Here, "containing no" inorganic particles means not containing a significant amount of inorganic particles. In the field of a hard coat forming coating material, the significant amount of inorganic particles is usually about 1 part by mass or more relative to 100 parts by mass of component (A). Therefore, "containing no" inorganic particles can be paraphrased as follows. That is, the amount of inorganic particles is usually 0 parts by mass or more and less than 1 part by mass, preferably 0.1 parts by mass or less, and more preferably 0.01 parts by mass or less relative to 100 parts by mass of component (A).

(A) Polyfunctional (Meth)Acrylate

The polyfunctional (meth)acrylate of component (A) is a (meth)acrylate having two or more (meth)acryloyl groups in one molecule. This component has two or more (meth) acryloyl groups in one molecule, and therefore serves to form a hard coat through polymerization and curing with an active energy ray such as an ultraviolet ray and an electron beam.

Examples of the polyfunctional (meth)acrylate include a (meth)acryloyl group-containing bifunctional reactive monomer such as diethylene glycol di(meth)acrylate, neopentyl glycol di(meth)acrylate, 1,6-hexanediol di(meth) acrylate, polyethylene glycol di(meth)acrylate, 2,2'-bis(4-(meth)acryloyloxypolyethyleneoxyphenyl)propane, and 2,2'-bis(4-(meth)acryloyloxypolypropyleneoxyphenyl)propane; a (meth)acryloyl group-containing trifunctional reactive monomer such as trimethylolpropane tri(meth)acrylate, trimethylolethane tri(meth)acrylate, and pentaerythritol tri (meth)acrylate; a (meth)acryloyl group-containing tetrafunctional reactive monomer such as pentaerythritol tetra (meth)acrylate; a (meth)acryloyl group-containing hexafunctional reactive monomer such as dipentaerythritol hexaacrylate; and a polymer (e.g. an oligomer and a prepolymer) containing one or more kinds thereof as constituent monomers. These compounds can be used singly or in a mixture of two or more kinds thereof as the polyfunctional (meth)acrylate of component (A).

The term (meth)acrylate herein means an acrylate or a methacrylate.

(B) Water-Repelling Agent

According to at least one embodiment, the water-repelling agent of component (B) serves to enhance finger slidability, fouling resistance, and wipeability against fouling.

Examples of the water-repelling agent include a wax water-repelling agent, such as a paraffin wax, a polyethylene wax, and an acrylate-ethylene copolymer wax; a silicone water-repelling agent such as a silicone oil, a silicone resin, a polydimethylsiloxane, and an alkylalkoxysilane; and a fluorine-containing water-repelling agent such as a fluoropolyether water-repelling agent and a fluoropolyalkyl water-repelling agent. These compounds can be used singly or in a mixture of two or more kinds thereof as the water-repelling agent of component (B).

Among these compounds, a fluoropolyether water-repelling agent is preferable as the water-repelling agent of component (B) from a viewpoint of water repellency. A water-repelling agent including a compound having a (meth) acryloyl group and a fluoropolyether group in a molecule (hereinafter, abbreviated as a (meth)acryloyl group-containing fluoropolyether water-repelling agent) is more preferable as the water-repelling agent of component (B) from a viewpoint of preventing a trouble such as bleed-out of the water-repelling agent of component (B) because of a chemical bond or a strong interaction between the polyfunctional (meth)acrylate of component (A) and the water-repelling agent of component (B). An admixture of an acryloyl group-containing fluoropolyether water-repelling agent and a methacryloyl group-containing fluoropolyether water-repelling agent is still more preferable as the water-repelling agent of component (B) from a viewpoint of appropriately controlling a chemical bond or an interaction between the polyfunctional (meth)acrylate of component (A) and the water-repelling agent of component (B) to exhibit good water repellency while keeping high transparency. It should be noted that the (meth)acryloyl group-containing fluoropolyether water-repelling agent is clearly distinguished from component (A) in having a fluoropolyether group in a molecule. Herein, a compound having two or more (meth) acryloyl groups and having a fluoropolyether group in one molecule is the (meth)acryloyl group-containing fluoropolyether water-repelling agent, which is classified into component (B). That is, a compound having a fluoropolyether group is excluded from the definition of the polyfunctional (meth)acrylate of component (A).

According to at least one embodiment, the blending amount of the water-repelling agent of component (B) is usually 7 parts by mass or less, preferably 4 parts by mass or less, and more preferably 2 parts by mass or less relative to 100 parts by mass of the polyfunctional (meth)acrylate of component (A) from a viewpoint of preventing a trouble such as bleed-out of the water-repelling agent of component (B). At the same time, the blending amount of the water-repelling agent of component (B) is usually 0.01 parts by mass or more, preferably 0.05 parts by mass or more, and more preferably 0.1 parts by mass or more from a viewpoint of obtaining an effect of use of the water-repelling agent of component (B). The blending amount of the water-repelling agent may be usually 0.01 parts by mass or more and 7 parts by mass or less, preferably 0.01 parts by mass or more and 4 parts by mass or less, or 0.01 parts by mass or more and 2 parts by mass or less, preferably 0.05 parts by mass or more and 7 parts by mass or less, 0.05 parts by mass or more and 4 parts by mass or less, or 0.05 parts by mass or more and 2 parts by mass or less, or preferably 0.1 parts by mass or more and 7 parts by mass or less, 0.1 parts by mass or more and 4 parts by mass or less, or 0.1 parts by mass or more and 2 parts by mass or less.

(C) Silane Coupling Agent

According to at least one embodiment, the silane coupling agent of component (C) serves to enhance adhesiveness between the first hard coat and the second hard coat.

According to at least one embodiment, the silane coupling agent is a silane compound having at least two kinds of different reactive groups selected from a hydrolyzable group (for example, an alkoxy group such as a methoxy group and an ethoxy group; an acyloxy group such as an acetoxy group; or a halogen group such as a chloro group) and an organic functional group (for example, an amino group, a mercapto group, a vinyl group, an epoxy group, a methacryloxy group, an acryloxy group, or an isocyanate group). Among these compounds, a silane coupling agent having an amino group (i.e. a silane compound having an amino group and a hydrolyzable group) and a silane coupling agent having a mercapto group (i.e. a silane compound having a mercapto group and a hydrolyzable group) are preferable as the silane coupling agent of component (C) from a viewpoint of adhesiveness. A silane coupling agent having an amino group is more preferable from a viewpoint of adhesiveness and odor.

Examples of the silane coupling agent having an amino group include N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysane, 3-triethoxysilyl-N-(1,3-dimethyl-butylidene) propylamine, N-phenyl-3-aminopropyltrimethoxysilane, and N-(vinylbenzyl)-2-aminoethyl-3-aminopropyltrimethoxysilane.

Examples of the silane coupling agent having a mercapto group include 3-mercaptopropylmethyldimethoxysilane and 3-mercaptopropyltrimethoxysilane.

These compounds can be used singly or in a mixture of two or more kinds thereof as the silane coupling agent of component (C).

According to at least one embodiment, the blending amount of the silane coupling agent of component (C) is usually 0.01 parts by mass or more, preferably 0.05 parts by mass or more, and more preferably 0.1 parts by mass or more relative to 100 parts by mass of the polyfunctional (meth)acrylate of component (A) from a viewpoint of obtaining an adhesiveness-enhancing effect reliably. At the same time, the blending amount of the silane coupling agent of component (C) may be usually 10 parts by mass or less, preferably 5 parts by mass or less, and more preferably 1 part by mass or less from a viewpoint of a pot life of a coating material. The blending amount of the silane coupling agent may be usually 0.01 parts by mass or more and 10 parts by mass or less, preferably 0.01 parts by mass or more and 5 parts by mass or less, or 0.01 parts by mass or more and 1 part by mass or less, or preferably 0.05 parts by mass or more and 10 parts by mass or less, 0.05 parts by mass or more and 5 parts by mass or less, or 0.05 parts by mass or more and 1 part by mass or less, or preferably 0.1 parts by mass or more and 10 parts by mass or less, 0.1 parts by mass or more and 5 parts by mass or less, or 0.1 parts by mass or more and 1 part by mass or less.

It should be noted that the blending amount of the silane coupling agent of component (C) in any usual or preferable range referred to herein can be combined with the blending amount of the water-repelling agent of component (B) in any usual or preferable range referred to above.

The first hard coat forming coating material preferably further includes a compound having two or more isocyanate groups (—N=C=O) in one molecule and/or a photopolymerization initiator from a viewpoint of improving curability with an active energy ray.

Examples of the compound having two or more isocyanate groups in one molecule include methylenebis-4-cyclohexylisocyanate; a polyisocyanate such as a trimethylolpropane adduct form of tolylene diisocyanate, a trimethylolpropane adduct form of hexamethylene diisocyanate, a trimethylolpropane adduct form of isophorone diisocyanate, an isocyanurate form of tolylene diisocyanate, an isocyanurate form of hexamethylene diisocyanate, an isocyanurate form of isophorone diisocyanate, and a biuret form of hexamethylene diisocyanate; and a urethane crosslinking agent such as blocked isocyanates of the polyisocyanates. These compounds can be used singly or in a mixture of two or more kinds thereof as the compound having two or more isocyanate groups in one molecule. In crosslinking, a catalyst such as dibutyltin dilaurate and dibutyltin diethylhexoate may be added as necessary.

Examples of the photopolymerization initiator include a benzophenone compound such as benzophenone, methyl-o-benzoyl benzoate, 4-methylbenzophenone, 4,4'-bis(diethylamino) benzophenone, methyl o-benzoylbenzoate, 4-phenylbenzophenone, 4-benzoyl-4'-methyldiphenyl sulfide, 3,3',4,4'-tetra(tert-butylperoxycarbonyl) benzophenone, and 2,4,6-trimethylbenzophenone; a benzoin compound such as benzoin, benzoin methyl ether, benzoin ethyl ether, benzoin isopropyl ether, and benzyl methyl ketal; an acetophenone compound such as acetophenone, 2,2-dimethoxy-2-phenylacetophenone, and 1-hydroxycyclohexyl phenyl ketone; an anthraquinone compound such as methylanthraquinone, 2-ethylanthraquinone, and 2-amylanthraquinone; a thioxanthone compound such as thioxanthone, 2,4-diethylthioxanthone, and 2,4-diisopropylthioxanthone; an alkylphenone compound such as acetophenone dimethyl ketal; a triazine compound; a biimidazole compound; an acylphosphine oxide compound; a titanocene compound; an oxime ester compound; an oxime phenylacetate compound; a hydroxyketone compound; and an aminobenzoate compound. These compounds can be used singly or in a mixture of two or more kinds thereof as the photopolymerization initiator.

According to at least one embodiment, the first hard coat forming coating material can include one or more additives such as an antistatic agent, a surfactant, a leveling agent, a thixotropy-imparting agent, an anti-fouling agent, a printability improver, an antioxidant, a weather resistance stabilizer, a light resistance stabilizer, an ultraviolet absorber, a heat stabilizer, organic fine particles, and an organic colorant, as desired.

The first hard coat forming coating material may include a solvent as desired for dilution to a concentration which allows easy application. The solvent is not particularly limited as long as the solvent neither reacts with any of components (A) to (C) and other optional components nor catalyzes (promotes) a self-reaction (including a degradation reaction) of these components. Examples of the solvent include 1-methoxy-2-propanol, ethyl acetate, n-butyl acetate, toluene, methyl ethyl ketone, methyl isobutyl ketone, diacetone alcohol, and acetone. These compounds can be used singly or in a mixture of two or more kinds thereof as the solvent.

The first hard coat forming coating material can be obtained by mixing and stirring these components.

A method for forming the first hard coat using the first hard coat forming coating material is not particularly limited, but any known web applying method can be used. Specific examples thereof include roll coating, gravure coating, reverse coating, roll brushing, spray coating, air knife coating, and die coating.

The thickness of the first hard coat is preferably 0.5 μm or more, and more preferably 1 μm or more from a viewpoint of abrasion resistance and hardness. At the same time, the thickness of the first hard coat is preferably 5 μm or less, more preferably 4 μm or less, and still more preferably 3 μm or less from a viewpoint of hardness and adhesiveness to the second hard coat. The thickness of the first hard coat may be preferably 0.5 μm or more and 5 μm or less, and more preferably 0.5 μm or more and 4 μm or less, 0.5 μm or more and 3 μm or less, 1 μm or more and 5 μm or less, 1 μm or more and 4 μm or less, or 1 μm or more and 3 μm or less.

Second Hard Coat

The second hard coat is formed of a coating material containing inorganic particles. The second hard coat is preferably formed of a coating material including 100 parts by mass of the (A) polyfunctional (meth)acrylate and 50 to 300 parts by mass of (D) inorganic fine particles having an average particle size of 1 to 300 nm.

As the (A) polyfunctional (meth)acrylate for the second hard coat, the same compounds as those described above for the first hard coat forming coating material can be used. These compounds can be used singly or in a mixture of two or more kinds thereof as the polyfunctional (meth)acrylate of component (A).

(D) Inorganic Fine Particles Having an Average Particle Size of 1 to 300 nm

According to at least one embodiment, the inorganic fine particles of component (D) serve to dramatically enhance hardness of a hard coat forming surface of the pressure-sensitive adhesive film.

Examples of the inorganic fine particles include silica (silicon dioxide); metal oxide fine particles of aluminum oxide, zirconia, titanic, zinc oxide, germanium oxide, indium oxide, tin oxide, indium tin oxide, antimony oxide, cerium oxide, or the like; metal fluoride fine particles of magnesium fluoride, sodium fluoride, or the like; metal sulfide fine particles; metal nitride fine particles; and metal fine particles. These compounds can be used singly or in a mixture of two or more kinds thereof.

Among these particles, in order to obtain a hard coat having higher surface hardness, fine particles of silica or aluminum oxide are preferable, and fine particles of silica are more preferable. Examples of commercially available silica fine particles include Snowtex (trade name) available from Nissan Chemical Industries, Ltd. and Quartron (trade name) available from Fuso Chemical Co., Ltd.

In order to enhance dispersibility of inorganic fine particles in a coating material or enhance surface hardness of a hard coat obtained, it is preferable to use inorganic fine particles the surfaces of which have been treated with any one selected from a silane coupling agent such as vinylsilane and aminosilane; a titanate coupling agent; an aluminate coupling agent; an organic compound having a reactive functional group such as an ethylenically unsaturated bond group such as a (meth)acryloyl group, a vinyl group, and an allyl group, and an epoxy group; a surface-treatment agent such as a fatty acid and a fatty acid metal salt; and the like.

According to at least one embodiment, the average particle size of the inorganic fine particles of component (D) is usually 300 nm or less, preferably 200 nm or less, and more preferably 120 nm or less from a viewpoint of retaining transparency of a hard coat and obtaining a hardness-improving effect reliably. On the other hand, the lower limit of the average particle size is not particularly specified, but the average particle size of inorganic fine particles usually available is about 1 nm at the finest.

The average particle size of the inorganic fine particles herein refers to a particle size at which a cumulative value from the smallest particle size reaches 50% by mass in a particle size distribution curve measured using a laser diffraction/scattering particle size analyzer "MT 3200 II" (trade name) available from Nikkiso Co., Ltd.

According to at least one embodiment, the blending amount of the inorganic fine particles of component (D) is usually 50 parts by mass or more, and preferably 80 parts by mass or more relative to 100 parts by mass of the polyfunctional (meth)acrylate of component (A) from a viewpoint of surface hardness. At the same time, the blending amount of the inorganic fine particles is usually 300 parts by mass or less, preferably 200 parts by mass or less, and more preferably 160 parts by mass or less from a viewpoint of transparency. The blending amount of the inorganic fine particles may be usually 50 parts by mass or more and 300 parts by mass or less, preferably 50 parts by mass or more and 200 parts by mass or less, or 50 parts by mass or more and 160 parts by mass or less, or preferably 80 parts by mass or more and 300 parts by mass or less, or 80 parts by mass or more and 200 parts by mass or less, or 80 parts by mass or more and 160 parts by mass or less.

(E) Leveling Agent

The second hard coat forming coating material preferably further includes a leveling agent (E) from a viewpoint of smoothing a surface of the second hard coat to form the first hard coat easily.

Examples of the leveling agent include an acrylic leveling agent, a silicone leveling agent, a fluorine leveling agent, a silicone-acrylate copolymer leveling agent, a fluorine-modified acrylic leveling agent, a fluorine-modified silicone leveling agent, and a leveling agent obtained by introducing therein a functional group (for example, an alkoxy group such as a methoxy group and an ethoxy group, an acyloxy group, a halogen group, an amino group, a vinyl group, an epoxy group, a methacryloxy group, an acryloxy group, an isocyanate group, and the like). Among these compounds, a silicone-acrylate copolymer leveling agent is preferable as the leveling agent of component (E). These compounds can be used singly or in a mixture of two or more kinds thereof as component (E).

According to at least one embodiment, the blending amount of the leveling agent of component (E) is usually 0.01 parts by mass or more, preferably 0.1 parts by mass or more, and more preferably 0.2 parts by mass or more relative to 100 parts by mass of the polyfunctional (meth)acrylate of component (A) from a viewpoint of smoothing a surface of the second hard coat to form the first hard coat easily. At the same time, the blending amount of the leveling agent of component (E) may be 1 part by mass or less, preferably 0.6 parts by mass or less, and more preferably 0.4 parts by mass or less from a viewpoint of satisfactorily applying the first hard coat forming coating material on the second hard coat without being repelled. The blending amount of the leveling agent may be usually 0.01 parts by mass or more and 1 part by mass or less, preferably 0.01 parts by mass or more and 0.6 parts by mass or less, or 0.01 parts by mass or more and 0.4 parts by mass or less, or preferably 0.1 parts by mass or more and 1 part by mass or less, 0.1 parts by mass or more and 0.6 parts by mass or less, or 0.1 parts by mass or more and 0.4 parts by mass or less, or preferably 0.2 parts by mass or more and 1 part by mass or less, 0.2 parts by mass or more and 0.6 parts by mass or less, or 0.2 parts by mass or more and 0.4 parts by mass or less.

It should be noted that the blending amount of the leveling agent of component (E) in any usual or preferable range referred to herein can be combined with the blending amount of the inorganic fine particles of component (D) in any usual or preferable range referred to above.

According to at least one embodiment, the second hard coat forming coating material preferably further includes a compound having two or more isocyanate groups (—N=C=O) in one molecule and/or a photopolymerization initiator from a viewpoint of improving curability with an active energy ray.

As the compound having two or more isocyanate groups in one molecule for the second hard coat, the same compounds as those described above for the first hard coat forming coating material can be used. These compounds can be used singly or in a mixture of two or more kinds thereof as the compound having two or more isocyanate groups in one molecule.

As the photopolymerization initiator for the second hard coat, the same compounds as those described above for the first hard coat forming coating material can be used. These compounds can be used singly or in a mixture of two or more kinds thereof as the photopolymerization initiator.

According to at least one embodiment, the second hard coat forming coating material can include one or more additives such as an antistatic agent, a surfactant, a thixotropy-imparting agent, an anti-fouling agent, a printability improver, an antioxidant, a weather resistance stabilizer, a light resistance stabilizer, an ultraviolet absorber, a heat stabilizer, a colorant, and organic fine particles, as desired.

According to at least one embodiment, the second hard coat forming coating material may include a solvent as desired for dilution to a concentration which allows easy application. The solvent is not particularly limited as long as the solvent neither reacts with any of components (A) and (D) and other optional components nor catalyzes (promotes) a self-reaction (including a degradation reaction) of these components. Examples of the solvent include 1-methoxy-2-propanol, ethyl acetate, n-butyl acetate, toluene, methyl ethyl ketone, methyl isobutyl ketone, diacetone alcohol, and acetone. Among these compounds, 1-methoxy-2-propanol is preferable. These compounds can be used singly or in a mixture of two or more kinds thereof as the solvent.

The second hard coat forming coating material can be obtained by mixing and stirring these components.

A method for forming the second hard coat using the second hard coat forming coating material is not particularly limited, but any known web applying method can be used. Specific examples thereof include roll coating, gravure coating, reverse coating, roll brushing, spray coating, air knife coating, and die coating.

According to at least one embodiment, the thickness of the second hard coat is preferably 10 µm or more, more preferably 15 µm or more, and still more preferably 18 µm or more from a viewpoint of hardness. At the same time, the thickness of the second hard coat is preferably 30 µm or less, more preferably 27 µm or less, and still more preferably 25 µm or less from a viewpoint of curling resistance and bending resistance. The thickness of the second hard coat may be preferably 10 µm or more and 30 µm or less, and more preferably 10 µm or more and 27 µm or less, 10 µm or more and 25 µm or less, 15 µm or more and 30 µm or less, 15 µm or more and 27 µm or less, 15 µm or more and 25 µm or less, 18 µm or more and 30 µm or less, 18 µm or more and 27 µm or less, or 18 µm or more and 25 µm or less.

It should be noted that the thickness of the second hard coat in any preferable range referred to herein can be combined with the thickness of the first hard coat in any preferable range referred to above.

Transparent Resin Film

According to at least one embodiment, the transparent resin film is a layer functioning as a transparent film substrate for forming the first hard coat and the second hard coat thereon. Any transparent resin film can be used as the transparent resin film without limitation as long as having high transparency and being not colored. Examples thereof include films formed of a cellulose ester resin such as triacetylcellulose; a polyester resin such as polyethylene terephthalate; a cyclic hydrocarbon resin such as an ethylene-norbornene copolymer; an acrylic resin such as polymethyl methacrylate and polyethyl methacrylate; a poly(meth)acrylimide resin; an aromatic polycarbonate resin; a polyolefin resin such as polypropylene and 4-methyl-pentene-1; a polyamide resin; a polyarylate resin; a polymer-type urethane acrylate resin; and a polyimide resin. These films include an unstretched film, a uniaxially stretched film, and a biaxially stretched film. In addition, these films include a laminated film obtained by laminating two or more layers of one or more kinds thereof.

The thickness of the transparent resin film is not particularly limited, but can be any thickness as desired. When the pressure-sensitive adhesive film according to at least one embodiment is used for an application requiring no high rigidity for parts other than a display face plate of a touch panel, such as protection of a surface of the display face plate, the thickness of the transparent resin film may be usually 20 µm or more, and preferably 50 µm or more from a viewpoint of handleability. In a similar case, the thickness of the transparent resin film may be usually 250 µm or less, and preferably 150 µm or less from a viewpoint of economic efficiency. When the pressure-sensitive adhesive film according to at least one embodiment is used as a display face plate of a touch panel, the thickness of the transparent resin film may be usually 100 µm or more, preferably 200 µm or more, and more preferably 300 µm or more from a viewpoint of retaining rigidity. Furthermore, the thickness of the transparent resin film may be usually 1,500 µm or less, preferably 1,200 µm or less, and more preferably 1,000 µm or less from a viewpoint of meeting a requirement for a thinner touch panel.

According to at least one embodiment, the transparent resin film is preferably a poly(meth)acrylimide resin film. This allows the transparent resin film to make a pressure-sensitive adhesive film that is excellent in surface hardness, abrasion resistance, transparency, surface smoothness, appearance, rigidity, heat resistance, and dimensional stability. As a result, it can be used suitably as a pressure-sensitive adhesive film to protect a surface of a display face plate, a display face plate of a touch panel, or a transparent conductive substrate.

According to at least one embodiment, the poly(meth)acrylimide resin is a thermoplastic resin obtained by introducing characteristics of excellent heat resistance and dimensional stability derived from a polyimide resin and overcoming a drawback of being colored from pale yellow to reddish brown while high transparency, high surface hardness, and high rigidity derived from an acrylic resin are retained. The poly(meth)acrylimide resin is disclosed in JP 2011-519999 A, for example. The term poly(meth)acrylimide herein means polyacrylimide or polymethacrylimide.

The poly(meth)acrylimide resin is not limited as long as having high transparency and being not colored for the purpose of using the pressure-sensitive adhesive film for an optical article such as a touch panel, and any poly(meth)acrylimide resins can be used.

Preferable examples of the poly(meth)acrylimide resin include a poly(meth)acrylimide resin having a yellowness index of 3 or less (measured with a colorimeter "SolidSpec-3700" (trade name) available from Shimadzu Corporation in accordance with JIS K7105:1981). The yellowness index is more preferably 2 or less, and still more preferably 1 or less. Preferable examples of the poly(meth)acrylimide resin further include a poly(meth)acrylimide resin having a melt mass flow rate (measured under conditions of 260° C. and 98.07 N according to ISO 1133) of 0.1 to 20 g/10 min. from a viewpoint of an extrusion load or stability of a melted film. The melt mass flow rate is more preferably from 0.5 to 10 g/10 min. In addition, the glass transition temperature of the poly(meth)acrylimide resin is preferably 150° C. or higher from a viewpoint of heat resistance. The glass transition temperature is more preferably 170° C. or higher.

According to at least one embodiment, the poly(meth)acrylimide resin can further include, within a range not contrary to an object of the various embodiments, a thermoplastic resin other than a poly(meth)acrylimide resin; a pigment, an inorganic filler, an organic filler, and a resin filler; an additive such as a lubricant, an antioxidant, a weather resistance stabilizer, a heat stabilizer, a release agent, an antistatic agent, and a surfactant; or the like, as desired. The blending amount of the optional component(s) is usually about from 0.01 to 10 parts by mass relative to 100 parts by mass of the poly(meth)acrylimide resin.

Examples of a commercially available poly(meth)acrylimide resin include "PLEXIMID TT 50" (trade name) and "PLEXIMID TT 70" (trade name) available from Evonik Industry AG.

According to at least one embodiment, the poly(meth)acrylimide resin film may be preferably a transparent multilayer film obtained by laminating a first poly(meth)acrylimide resin layer ($\alpha 1$), an aromatic polycarbonate resin layer ($\beta$), and a second poly(meth)acrylimide resin layer ($\alpha 2$) directly in this order. Embodiments are herein described under the assumption that a touch surface is formed on a side of the $\alpha 1$ layer.

The poly(meth)acrylimide resin is excellent in heat resistance and surface hardness, but often has insufficient cutting processability. On the other hand, the aromatic polycarbonate resin has excellent cutting processability, but often poor in heat resistance and surface hardness. Therefore, use of a transparent multilayer film having the above layer configuration makes it possible to easily obtain a pressure-sensitive adhesive film that is excellent in all of heat resistance, surface hardness, and cutting processability by compensating for drawbacks of the two resins.

The layer thickness of the $\alpha 1$ layer is not particularly limited, but may be usually 20 µm or more, preferably 40 µm or more, more preferably 60 µm or more, and still more preferably 80 µm or more from a viewpoint of heat resistance and surface hardness of the pressure-sensitive adhesive film.

The layer thickness of the α2 layer is not particularly limited, but is preferably the same as the thickness of the α1 layer from a viewpoint of curling resistance of the pressure-sensitive adhesive film.

"The same layer thickness" referred to herein should not be interpreted to be the same layer thickness in a physico-chemically strict sense of the word. It should be interpreted to be the same layer thickness within a variation in a process/quality control usually performed industrially. The reason is that curling resistance of a multilayer film can be kept good when the layer thicknesses are the same within a variation in a process/quality control usually performed industrially. An unstretched multilayer film obtained by a T-die co-extrusion method is usually subjected to a process/quality control within a variation of about −5 to +5 μm, and therefore the layer thickness of 65 μm and the layer thickness of 75 μm should be interpreted to be identical. "The same layer thickness" here can be paraphrased as "substantially the same layer thickness".

According to at least one embodiment, the layer thickness of the β layer is not particularly limited, but may be usually 20 μm or more, and preferably 80 μm or more from a viewpoint of cutting processability of the pressure-sensitive adhesive film.

As the poly(meth) acrylimide resin for the α1 layer and the α2 layer, the compounds described above can be used.

Incidentally, as a poly(meth)acrylimide resin for the α1 layer and a poly(meth)acrylimide resin for the α2 layer, poly(meth)acrylimide resins having different resin characteristics, for example, different melt mass flow rates or glass transition temperatures, may be used. Poly(meth)acrylimide resins having the same resin characteristic may be preferably used from a viewpoint of curling resistance of the pressure-sensitive adhesive film. Use of poly(meth)acrylimide resins in the same grade and in the same lot is one of preferable embodiments, for example.

As the aromatic polycarbonate resin used for the β layer, for example, it is possible to use a single kind or a mixture of two or more kinds of aromatic polycarbonate resins such as a polymer obtained by an interfacial polymerization method using an aromatic dihydroxy compound such as bisphenol A, dimethyl bisphenol A, and 1,1-bis(4-hydroxyphenyl)-3,3,5-trimethylcyclohexane with phosgene; and a polymer obtained by a transesterification reaction of an aromatic dihydroxy compound such as bisphenol A, dimethyl bisphenol A, and 1,1-bis(4-hydroxyphenyl)-3,3,5-trimethylcyclohexane with a carbonate diester such as diphenyl carbonate.

Preferable examples of optional components which can be contained in the aromatic polycarbonate resin include a core-shell rubber. When the total amount of the aromatic polycarbonate resin and the core-shell rubber is 100 parts by mass, using the core-shell rubber in an amount of 0 to 30 parts by mass (i.e. 100 to 70 parts by mass of the aromatic polycarbonate resin), preferably in an amount of 0 to 10 parts by mass (i.e. 100 to 90 parts by mass of the aromatic polycarbonate resin) can enhance cutting processability and impact resistance of the pressure-sensitive adhesive film.

Examples of the core-shell rubber include a core-shell rubber such as a methacrylate-styrene/butadiene rubber graft copolymer, an acrylonitrile-styrene/butadiene rubber graft copolymer, an acrylonitrile-styrene/ethylene-propylene rubber graft copolymer, an acrylonitrile-styrene/acrylate graft copolymer, a methacrylate/acrylate rubber graft copolymer, and a methacrylate-acrylonitrile/acrylate rubber graft copolymer. These compounds can be used singly or in a mixture of two or more kinds thereof as the core-shell rubber.

The aromatic polycarbonate resin can further include, within a range not contrary to an object of the various embodiments, a thermoplastic resin other than an aromatic polycarbonate resin and a core-shell rubber; a pigment, an inorganic filler, an organic filler, and a resin filler; an additive such as a lubricant, an antioxidant, a weather resistance stabilizer, a heat stabilizer, a release agent, an antistatic agent, and a surfactant; or the like, as desired. The blending amount of the optional component(s) is usually about from 0.01 to 10 parts by mass relative to 100 parts by mass of the total amount of the aromatic polycarbonate resin and the core-shell rubber.

A method for manufacturing the poly(meth)acrylimide resin film (including a case where the film is the transparent multilayer film) is not particularly limited. Preferable examples of the manufacturing method include methods described in JP 2015-033844 A, JP 2015-034285 A, and JP 2015-083370 A.

In forming the second hard coat, a hard coat forming surface or both surfaces of the poly(meth)acrylimide resin film or the transparent multilayer film may be subjected to an adhesion-facilitating treatment such as a corona discharge treatment or anchor coat formation in advance in order to enhance adhesion strength to the second hard coat.

Pressure-Sensitive Adhesive Layer

According to at least one embodiment, the pressure-sensitive adhesive layer is a layer formed of a composition including a pressure-sensitive adhesive (hereinafter, sometimes simply referred to as "pressure-sensitive adhesive").

According to at least one embodiment, the pressure-sensitive adhesive to form the pressure-sensitive adhesive layer is not limited as long as having excellent transparency for the purpose of using the pressure-sensitive adhesive film according to at least one embodiment as an image display apparatus member. The pressure-sensitive adhesive is preferably excellent in transparency and non-coloration. As the pressure-sensitive adhesive, any pressure-sensitive adhesive, such as a known acrylic, urethane, rubber, and silicone adhesive can be used.

The "pressure-sensitive adhesive having excellent transparency" herein means a pressure-sensitive adhesive having a visible light transmittance of 80% or more, preferably 85% or more, more preferably 90% or more. Here, the visible light transmittance is a value calculated as a proportion of an integrated area of a transmission spectrum at wavelengths of 380 to 780 nm of a pressure-sensitive adhesive measured using a spectrophotometer "SolidSpec-3700" (trade name) available from Shimadzu Corporation and a quartz cell of 10 mm in optical path distance with respect to an integrated area of a transmission spectrum when the transmittance in the entire region at wavelengths of 380 to 780 nm is assumed to be 100%.

The "pressure-sensitive adhesive having excellent non-coloration" herein means a pressure-sensitive adhesive having a yellowness index of 3 or less, preferably 2 or less, more preferably 1 or less. Here, the yellowness index is a value measured according to JIS K7105:1981 using a chromaticity meter "SolidSpec-3700" (trade name) available from Shimadzu Corporation and a quartz cell of 10 mm in optical path distance.

When the pressure-sensitive adhesive film according to at least one embodiment is used as a display face plate, an acrylic pressure-sensitive adhesive is preferable from a viewpoint of light resistance and heat resistance. A silicone pressure-sensitive adhesive is also preferable. The acrylic pressure-sensitive adhesive is a pressure-sensitive adhesive composition including an acrylic polymer and an optional component(s) used as desired.

Examples of the acrylic polymer include a polymer or a copolymer obtained by using, as a monomer, one of or a mixture of two or more of a (meth)acrylate monomer such as methyl (meth)acrylate, ethyl (meth)acrylate, propyl (meth)acrylate, butyl (meth)acrylate, pentyl (meth)acrylate, hexyl (meth)acrylate, cyclohexyl (meth)acrylate, 2-ethylhexyl (meth)acrylate, isooctyl (meth)acrylate, decyl (meth)acrylate, dodecyl (meth)acrylate, myristyl (meth)acrylate, palmityl (meth)acrylate, and stearyl (meth)acrylate; a carboxyl group-containing monomer such as acrylic acid, methacrylic acid, itaconic acid, and β-carboxyethyl (meth)acrylate; an epoxy group-containing monomer such as glycidyl (meth)acrylate and 4-hydroxybutyl (meth)acrylate glycidyl ether; and a hydroxy group-containing (meth)acrylate monomer such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate. The term (meth)acrylic acid means an acrylic acid or a methacrylic acid. The term (meth)acrylate means an acrylate or a methacrylate. These compounds can be used singly or in a mixture of two or more kinds thereof as the acrylic polymer.

Examples of the optional component include a silane coupling agent, a compound having two or more epoxy groups in one molecule, a compound having two or more isocyanate groups in one molecule, a photopolymerization initiator, a reaction catalyst, an organic polyvalent metal compound, an antistatic agent, a surfactant, a leveling agent, a thixotropy-imparting agent, an anti-fouling agent, a printability improver, an antioxidant, a weather resistance stabilizer, a light resistance stabilizer, an ultraviolet absorber, a heat stabilizer, a pigment, and a filler. The blending amount of the optional component(s) may be about from 0.01 to 20 parts by mass relative to 100 parts by mass of the acrylic polymer.

In the case of using the pressure-sensitive adhesive film according to various embodiments as a pressure-sensitive adhesive film to protect the surface of a display face plate, from viewpoints that the pressure-sensitive adhesive film can be pasted to the surface even by hand without entraining bubbles and causing appearance defects such as bulges (hereinafter, referred to as "air bleedability"); the pasted pressure-sensitive adhesive film does not slip and peel in long-term use in the environment including temperature changes even without being imparted an external force (hereinafter, referred to as "heat cycle reliability"); and in renewal of the pasted pressure-sensitive adhesive film, the pressure-sensitive adhesive film can be peeled by hand without leaving any adhesive residue and without causing any change in the appearance thereof (hereinafter, referred to as "appearance sustainability at peeling"), a silicone pressure-sensitive adhesive is preferable.

As the silicone pressure-sensitive adhesive, either of an addition reaction type silicone pressure-sensitive adhesive and a peroxide curing type silicone pressure-sensitive adhesive can be used. The addition reaction type silicone pressure-sensitive adhesive is a pressure-sensitive adhesive composition including a silicone polymer having an addition-reactive organic group such as a vinyl group, an addition reaction catalyst including a platinum compound such as chloroplatinic acid, a rhodium complex, and a ruthenium complex, and an optional component(s) used as desired. The peroxide curing type silicone pressure-sensitive adhesive is a pressure-sensitive adhesive composition including a silicone polymer, an organic peroxide such as benzoyl peroxide, and an optional component(s) used as desired.

Examples of the optional component used for the pressure-sensitive adhesive composition include an antistatic agent, a surfactant, a leveling agent, a thixotropy-imparting agent, an anti-fouling agent, a printability improver, an antioxidant, a weather resistance stabilizer, a light resistance stabilizer, an ultraviolet absorber, a heat stabilizer, a pigment, and a filler. The blending amount of the optional component may be about from 0.01 to 20 parts by mass relative to 100 parts by mass of the silicone polymer.

A method for forming the pressure-sensitive adhesive layer using the pressure-sensitive adhesive is not particularly limited, but any web applying method can be used. Examples of the web applying method include roll coating, gravure coating, reverse coating, roll brushing, spray coating, air knife coating, and die coating. When the pressure-sensitive adhesive layer is formed, a known diluting solvent, for example, methyl ethyl ketone, methyl isobutyl ketone, ethyl acetate, n-butyl acetate, isopropanol, 1-methoxy-2-propanol, methanol, ethanol, toluene, xylene, or acetone can be used.

According to at least one embodiment, the thickness of the pressure-sensitive adhesive layer is not particularly limited, but may be usually from 0.5 to 200 μm, preferably from 1 to 120 μm, and more preferably from 5 to 50 μm in consideration of using a known web applying method.

It should be noted that the thickness of the pressure-sensitive adhesive layer in any usual or preferable range referred to herein can be combined with the thickness of the first hard coat in any usual or preferable range referred to above, and/or can be combined with the thickness of the second hard coat in any usual or preferable range referred to above.

Figure 2:
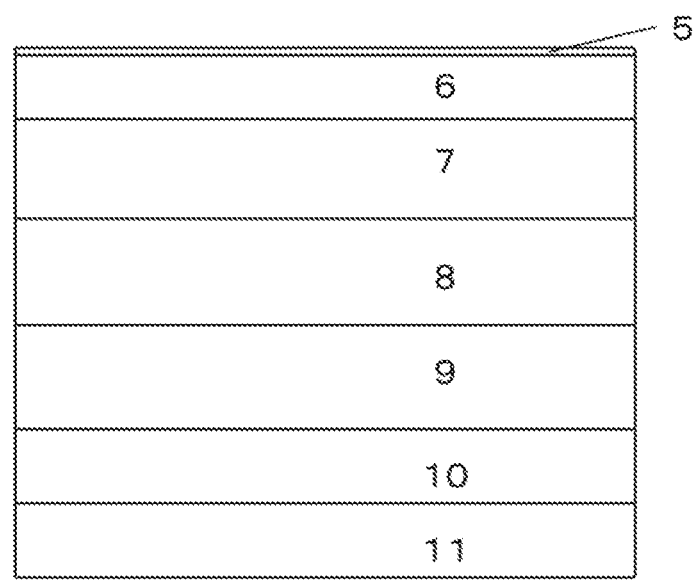
FIG. 2 is a conceptual cross-sectional view exemplifying a pressure-sensitive adhesive film according to an embodiment.

The pressure-sensitive adhesive film according to at least one embodiment preferably includes, in order from a surface side, the first hard coat, the second hard coat, the transparent resin film layer, a third hard coat, and the pressure-sensitive adhesive layer. A typical embodiment of a pressure-sensitive adhesive film with the third hard coat is illustrated in FIG. 2. In FIG. 2, the reference sign 5 represents a first hard coat, the reference sign 6 represents a second hard coat, the reference sign 7 represents a first poly(meth)acrylimide resin layer (α1), the reference sign 8 represents an aromatic polycarbonate resin layer (β), the reference sign 9 represents a second poly(meth)acrylimide resin layer (α2), the reference sign 10 represents a third hard coat, and the reference sign 11 represents a pressure-sensitive adhesive layer. The third hard coat formed allows a force to curl the pressure-sensitive adhesive film in one direction (hereinafter, also abbreviated as a curling force) and a force to curl the pressure-sensitive adhesive film in another direction to work simultaneously. By allowing these two curling forces to be canceled to be zero, occurrence of curling can be suppressed. The third hard coat forming coating material and the thicknesses of the third hard coat are not particularly limited as long as the two curling forces can be canceled. For the third hard coat forming coating material and the thickness of the third hard coat, those described above for the second hard coat may be used.

According to at least one embodiment, the pressure-sensitive adhesive film may include an optional layer(s) other than the first hard coat, the second hard coat, the transparent resin film layer, the third hard coat, and the pressure-sensitive adhesive layer, as desired. Examples of the optional layer include a hard coat other than the first to third hard coats, a pressure-sensitive adhesive layer other than the pressure-sensitive adhesive layer, an anchor coat, a transparent conductive layer, a high refractive index layer, a low refractive index layer, and a reflection-preventive layer.

As described above, the poly(meth)acrylimide resin film used as a transparent resin film is preferably a transparent multilayer film obtained by laminating a first poly(meth) acrylimide resin layer ($\alpha 1$), an aromatic polycarbonate resin layer ($\beta$), and a second poly(meth)acrylimide resin layer ($\alpha 2$) directly in this order. There is no intention to exclude a transparent multilayer film including an optional layer(s) (for example, a pressure-sensitive adhesive layer, a transparent conductive layer, a high refractive index layer, a low refractive index layer, or a reflection-preventive layer) in addition to these layers from the scope of the invention.

The total light transmittance (measured according to JIS K7361-1:1997 using a turbidimeter "NDH2000" (trade name) available from Nippon Denshoku Industries Co., Ltd.) of the pressure-sensitive adhesive film according to at least one embodiment is preferably 85% or more, more preferably 88% or more, still more preferably 89% or more, and most preferably 90% or more. When the total light transmittance is 85% or more, the pressure-sensitive adhesive film according to at least one embodiment can be suitably used as an image display apparatus member. A higher total light transmittance is more preferable.

The haze (measured according to JIS K7136:2000 using a turbidimeter "NDH2000" (trade name) available from Nippon Denshoku Industries Co., Ltd.) of the pressure-sensitive adhesive film according to at least one embodiment is preferably 3% or less, more preferably 2% or less, still more preferably 1.5% or less, and most preferably 1% or less. When the haze is 3% or less, the pressure-sensitive adhesive film according to at least one embodiment can be suitably used as an image display apparatus member. A lower haze is more preferable.

For the pressure-sensitive adhesive film according to at least one embodiment, the first hard coat surface has a pencil hardness (measured with a pencil "UNI" (trade name) available from Mitsubishi Pencil Co., Ltd. under a condition of a load of 750 g in accordance with JIS K5600-5-4) of preferably 5H or more, more preferably 6H or more, still more preferably 7H or more. When the pencil hardness is 5H or more, the pressure-sensitive adhesive film according to at least one embodiment can be suitably used as an image display apparatus member. A higher pencil hardness is more preferable.

The pressure-sensitive adhesive film according to at least one embodiment preferably fulfills both a total light transmittance of 85% or more and a pencil hardness of 5H or more on the first hard coat surface. In addition, the pressure-sensitive adhesive film according to at least one embodiment preferably fulfills both a total light transmittance of 88% or more and a pencil hardness of 5H or more on the first hard coat surface; or, both a total light transmittance of 89% or more and a pencil hardness of 5H or more on the first hard coat surface; or, both a total light transmittance of 90% or more and a pencil hardness of 5H or more on the first hard coat surface; or, both a total light transmittance of 85% or more and a pencil hardness of 6H or more on the first hard coat surface; or, both a total light transmittance of 88% or more and a pencil hardness of 6H or more on the first hard coat surface; or, both a total light transmittance of 89% or more and a pencil hardness of 6H or more on the first hard coat surface; or, both a total light transmittance of 90% or more and a pencil hardness of 6H or more on the first hard coat surface; or, both a total light transmittance of 85% or more and a pencil hardness of 7H or more on the first hard coat surface; or, both a total light transmittance of 88% or more and a pencil hardness of 7H or more on the first hard coat surface; or, both a total light transmittance of 89% or more and a pencil hardness of 7H or more on the first hard coat surface; or, both a total light transmittance of 90% or more and a pencil hardness of 7H or more on the first hard coat surface.

The pressure-sensitive adhesive film according to at least one embodiment has a minimum bending radius of preferably 40 mm or less, more preferably 35 mm or less, still more preferably 30 mm or less. When the minimum bending radius is 40 mm or less, the pressure-sensitive adhesive film according to at least one embodiment can be easily handled as a film roll, and the pressure-sensitive adhesive film becomes advantageous in terms of a manufacturing efficiency or the like. A smaller minimum bending radius is more preferable. Here, the minimum bending radius is a value measured according to a test (x) in the following Examples.

It should be noted that the minimum bending radius is a minimum radius capable of bending a hard coat laminated film without generation of a crack on a surface of a bending portion when the hard coat laminated film is bent, and indicates a limit against bending. A bending radius is defined in a similar manner to a radius of curvature.

Figure 3:
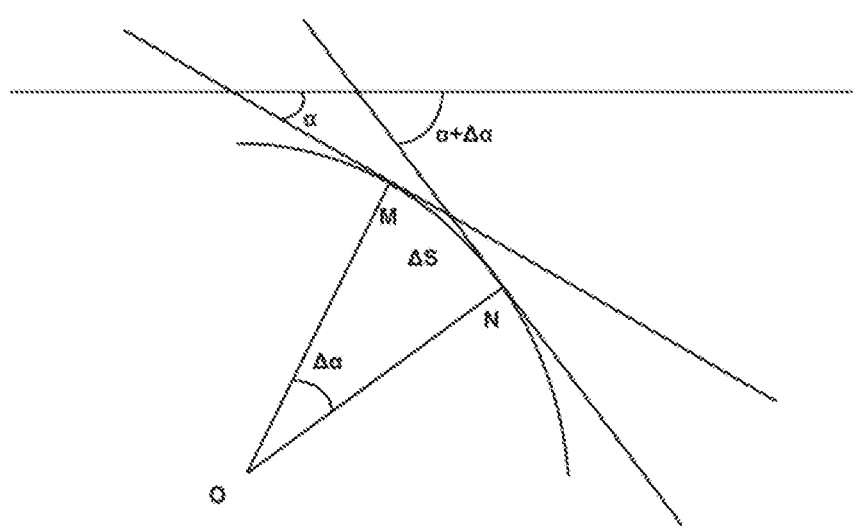
FIG. 3 is a diagram for describing a radius of curvature.

The radius of curvature is defined as follows with reference to FIG. 3. When a length from a point M to a point N in the curve is denoted as $\Delta S$; a difference between a slope of a tangent line at the point M and a slope of a tangent line at the point N is denoted as $\Delta \alpha$; and an intersection of a line which is perpendicular to the tangent line at the point M and intersects with the tangent line at the point M and a line which is perpendicular to the tangent line at the point N and intersects with the tangent line at the point N is denoted as O, in a case where $\Delta S$ is sufficiently small, the curve from the point M to the point N can be approximated to an arc (FIG. 3). The radius in this case is defined as the radius of curvature. Furthermore, when the radius of curvature is denoted as R, $\angle MON = \Delta \alpha$ is satisfied. In a case where $\Delta S$ is sufficiently small, $\Delta \alpha$ is also sufficiently small, and therefore $\Delta S = R \Delta \alpha$ is satisfied. As the result, $R = \Delta S / \Delta \alpha$ is satisfied.

For the pressure-sensitive adhesive film according to at least one embodiment, the first hard coat surface has a water contact angle of preferably 100° or more, more preferably 105° or more. When the pressure-sensitive adhesive film according to at least one embodiment is used as a display face plate protective film or a display face plate of an image display apparatus having a touch panel function, the first hard coat usually forms a touch surface. The water contact angle at the first hard coat surface of 100° or more makes it possible to operate a touch panel by sliding a finger or a pen on a touch surface according to one's own will. A higher water contact angle is more preferable from a viewpoint of sliding a finger or a pen according to one's own will. The upper limit of the water contact angle is not particularly specified, but about 120° is usually sufficient from a viewpoint of finger slidability. Here, the water contact angle is a value measured according to a test (iv) in the following Examples.

For the pressure-sensitive adhesive film according to at least one embodiment, the first hard coat surface preferably has a water contact angle of 100° or more after 20,000 reciprocating wipes with a cotton. The surface of the first hard coat more preferably has a water contact angle of 100° or more after 25,000 reciprocating wipes with a cotton. The water contact angle of 100° or more after 20,000 reciprocating wipes with a cotton makes it possible to maintain a surface characteristic such as finger slidability even after repeated wipes with a handkerchief or the like. For the number of wipes with a cotton during which a water contact angle of 100° or more can be maintained, a larger number is more preferable. Here, the water contact angle after wipes with a cotton is a value measured according to a test (v) in the following Examples.

For the pressure-sensitive adhesive film according to at least one embodiment, it is preferable that the water contact angle at the first hard coat surface is 100° or more and the water contact angle at the first hard coat surface after 20,000 reciprocating wipes with a cotton is 100° or more. Furthermore, for the pressure-sensitive adhesive film according to at least one embodiment, it is preferable that the water contact angle at the first hard coat surface is 105° or more and the water contact angle at the first hard coat surface after 20,000 reciprocating wipes with a cottons is 100° or more, or that the water contact angle at the first hard coat surface is 100° or more and the water contact angle at the first hard coat surface after 25,000 reciprocating wipes with a cotton is 100° or more, or that the water contact angle at the first hard coat surface is 105° or more and the water contact angle at the first hard coat surface after 25,000 reciprocating wipes with a cotton is 100° or more.

It should be noted that the total light transmittance in any preferable range referred to above can be combined with the water contact angle at the first hard coat surface in any preferable range referred to herein, and/or can be combined with the water contact angle at the first hard coat surface after 20,000 reciprocating wipes with a cotton in any preferable range referred to herein. In addition, the total light transmittance in any preferable range referred to above can be combined with the pencil hardness on the first hard coat surface in any preferable range referred to above and can be combined with the water contact angle at the first hard coat surface in any preferable range referred to herein, and/or can be combined with the water contact angle at the first hard coat surface after 20,000 or 25,000 reciprocating wipes with a cotton in any preferable range referred to herein.

The pressure-sensitive adhesive film according to at least one embodiment has a yellowness index (measured according to HS K7105:1981 using a chromaticity meter "SolidSpec-3700" (trade name) available form Shimadzu Corporation) of preferably 3 or less, more preferably 2 or less, still more preferably 1 or less. A lower yellowness index is more preferable. Due to the yellowness index of 3 or less, the pressure-sensitive adhesive film according to at least one embodiment can be suitably used as an image display apparatus member.

Manufacturing Method

The pressure-sensitive adhesive film according to at least one embodiment can be manufactured by any method which is not particularly limited. For example, from a viewpoint of adhesiveness between the first hard coat and the second hard coat, a preferable manufacturing method includes:

(1) a step of forming a wet coat of the second hard coat forming coating material on one surface of the transparent resin film;

(2) a step of irradiating the wet coat of the second hard coat forming coating material with an active energy ray at an integrated amount of light of 1 to 230 mJ/cm$^2$, preferably 5 to 200 mJ/cm$^2$, more preferably 10 to 160 mJ/cm$^2$, still more preferably 20 to 120 mJ/cm$^2$, most preferably 30 to 100 mJ/cm$^2$, and converting the wet coat of the second hard coat forming coating material into a coat in a set-to-touch state;

(3) a step of forming a wet coat of the first hard coat forming coating material on the coat of the second hard coat forming coating material in a set-to-touch state;

(4) a step of preheating the wet coat of the first hard coat forming coating material to a temperature of 30 to 100° C., preferably 40 to 85° C., more preferably 50 to 75° C., and irradiating the wet coat with an active energy ray at an integrated amount of light of 240 to 10,000 mJ/cm$^2$, preferably 320 to 5,000 mJ/cm$^2$, more preferably 360 to 2,000 mJ/cm$^2$; and (5) a step of forming the pressure-sensitive adhesive layer on a surface of the transparent resin film, opposite to a hard coat forming surface, from a viewpoint of adhesiveness between the first hard coat and the second hard coat.

In the step (1), a method for forming the wet coat of the second hard coat forming coating material is not particularly limited, but a known web applying method can be used. Specific examples thereof include roll coating, gravure coating, reverse coating, roll brushing, spray coating, air knife coating, and die coating.

The wet coat of the second hard coat forming coating material formed in the step (1) is in a set-to-touch state or in a state with no tackiness in the step (2), causing no problem in handling such as sticking even in direct contact with a web apparatus. Therefore, in the subsequent step (3), a wet coat formed of the first hard coat forming coating material can be formed on the coat of the second hard coat forming coating material in a set-to-touch state.

The clause "a coat is in a set-to-touch state (in a state with no tackiness)" herein means that a coat is in a state in which no problem in handling occurs even when the coat is in direct contact with a web apparatus.

Irradiation with an active energy ray in the step (2) is performed such that the integrated amount of light is usually 1 mJ/cm$^2$ or more, preferably 5 mJ/cm$^2$ or more, more preferably 10 mJ/cm$^2$ or more, still more preferably 20 mJ/cm$^2$ or more, and most preferably 30 mJ/cm$^2$ or more from a viewpoint of converting the coat into a coat in a set-to-touch state reliably, although depending on a characteristic of the second hard coat forming coating material. At the same time, irradiation with an active energy ray is performed such that the integrated amount of light is usually 230 mJ/cm$^2$ or less, preferably 200 mJ/cm$^2$ or less, more preferably 160 mJ/cm$^2$ or less, still more preferably 120 mJ/cm$^2$ or less, and most preferably 100 mJ/cm$^2$ or less from a viewpoint of adhesiveness between the first hard coat and the second hard coat.

The wet coat of the second hard coat forming coating material is preferably predried before irradiation with an active energy ray in the step (2). Predrying described above can be performed by causing a web to pass through a drying furnace set at a temperature of about 23 to 150° C., preferably 50 to 120° C., at a line speed such that the time required to pass from the inlet to the outlet is about from 0.5 to 10 minutes and preferably from 1 to 5 minutes, for example.

When irradiation with an active energy ray is performed in the step (2), the wet coat formed of the second hard coat forming coating material may be preheated to a temperature of 40 to 120° C., preferably 70 to 100° C. This can convert the coat into a coat in a set-to-touch state reliably. A method for preheating the coat described above is not particularly limited, but any method can be used. Specific examples of the method will be described below in the description of the step (4).

In the step (3), a method for forming the wet coat of the first hard coat forming coating material is not particularly limited, but a known web applying method can be used.

Specific examples thereof include roll coating, gravure coating, reverse coating, roll brushing, spray coating, air knife coating, and die coating.

The wet coat of the first hard coat forming coating material formed in the step (3) is completely cured in the step (4). At the same time, the coat of the second hard coat forming coating material is also completely cured.

The above method can enhance adhesiveness between the first hard coat and the second hard coat, and without wishing to be bound by any theory it is presumed that the reason is that complete curing is simultaneously achieved for both the hard coats by limiting the integrated amount of light in irradiation with an active energy ray to an amount sufficient to convert the coat into a coat in a set-to-touch state but insufficient to completely cure the coat in the step (2) and setting the integrated amount of light to an amount sufficient to completely cure the coat in the step (4) for the first time.

Irradiation with an active energy ray in the step (4) is performed such that the integrated amount of light is 240 $mJ/cm^2$ or more, preferably 320 $mJ/cm^2$ or more, and more preferably 360 $mJ/cm^2$ or more from a viewpoint of completely curing the coat and adhesiveness between the first hard coat and the second hard coat. At the same time, the irradiation is performed such that the integrated amount of light is usually 10,000 $mJ/cm^2$ or less, preferably 5,000 $mJ/cm^2$ or less, and more preferably 2,000 $mJ/cm^2$ or less from viewpoints of preventing yellowing of a hard coat laminated film obtained and cost.

The wet coat of the first hard coat forming coating material is preferably predried before irradiation with an active energy ray in the step (4). Predrying described above can be performed by causing a web to pass through a drying furnace set at a temperature of about 23 to 150° C., preferably 50 to 120° C., at a line speed such that the time required to pass from the inlet to the outlet is about from 0.5 to 10 minutes and preferably from 1 to 5 minutes, for example.

In irradiation with an active energy ray in the step (4), the wet coat of the first hard coat forming coating material is favorably preheated to a temperature of usually 30 to 100° C., preferably 40 to 85° C., more preferably 50 to 75° C. even when the first hard coat forming coating material and the second hard coat forming coating material are largely different in characteristics from each other from a viewpoint of obtaining a good interlayer adhesion strength. A method for preheating the coat described above is not particularly limited, but any method can be used. Examples thereof include a method in which a web is held by a mirror-finished metal roll 2 disposed opposite to an active energy ray (ultraviolet ray) irradiator 1 as illustrated in FIG. 1 and a surface temperature of the roll is controlled to a predetermined temperature; a method in which a temperature in an irradiation furnace surrounding an active energy ray irradiator is controlled to a predetermined temperature; and a combination of these methods.

A method for forming the pressure-sensitive adhesive layer using the pressure-sensitive adhesive in the step (5) is not particularly limited, but any web applying method can be used. Examples of the web applying method include roll coating, gravure coating, reverse coating, roll brushing, spray coating, air knife coating, and die coating. When the pressure-sensitive adhesive layer is formed, a known diluting solvent, for example, methyl ethyl ketone, methyl isobutyl ketone, ethyl acetate, n-butyl acetate, isopropanol, 1-methoxy-2-propanol, methanol, ethanol, toluene, xylene, or acetone can be used.

An aging treatment may be performed after the step (4), after the step (5), or after the step (4) and after the step (5). The aging treatment can stabilize characteristics of the pressure-sensitive adhesive film.

EXAMPLES

Hereinafter, various embodiments will be described with reference to Examples, but the present invention is not limited thereto.

Measurement and Evaluation Method

A measurement and evaluation method for physical properties of a hard coat laminated film will be described.

(i) Total Light Transmittance

According to JIS K7361-1:1997, the total light transmittance of a pressure-sensitive adhesive film was measured using a turbidimeter "NDH 2000" (trade name) available from Nippon Denshoku Industries Co.

(ii) Haze

According to JIS K7136:2000, the haze of a pressure-sensitive adhesive film was measured using a turbidimeter "NDH 2000" (trade name) available from Nippon Denshoku Industries Co., Ltd.

(iii) Yellowness Index

According to JIS K7105:1981, the yellowness index of a pressure-sensitive adhesive film was measured using a colorimeter "SolidSpec-3700" (trade name) available from Shimadzu Corporation.

(iv) Water Contact Angle (Initial Water Contact Angle)

The water contact angle at a first hard coat surface of a pressure-sensitive adhesive film was measured by a method for calculating the water contact angle from a width and a height of a water droplet (see JIS R3257:1999) using an automatic contact angle meter "DSA20" (trade name) available from KRUSS GmbH.

(v) Abrasion Resistance 1 (Water Contact Angle after Wipes with Cotton)

A test piece was taken such that the size thereof was 150 mm in length and 50 mm in width and the machine direction of a pressure-sensitive adhesive film was in the longitudinal direction of the test piece. This test piece was placed on a Gakushin tester according to JIS L0849:2013 such that the first hard coat of the pressure-sensitive adhesive film was a surface. A stainless steel plate (10 mm in length, 10 mm in width, 1 mm in thickness) covered with a four-stacked-sheet gauze (medical type 1 gauze available from Kawamoto Corp.) was attached to a friction terminal of the Gakushin tester such that the length and width surface of the stainless steel plate was brought into contact with the test piece. A load of 350 g was placed on the stainless steel plate covered with the gauze, and the first hard coat surface of the test piece was rubbed 10,000 times reciprocatingly under conditions of a moving distance of the friction terminal of 60 mm and a speed of one reciprocation/sec. Thereafter, the water contact angle at the cotton-wiped portion was measured according to the method of the (iv). When the water contact angle was 100° or more, an operation of additionally performing 5,000 reciprocating rubs and then measuring the water contact angle at the cotton-wiped portion according to the method of the (iv) was repeated, and abrasion resistance was evaluated according to the following criteria.

A: The water contact angle was 100° or more even after 25,000 reciprocating rubs.

B: After 20,000 reciprocating rubs, the water contact angle was 100° or more, but after 25,000 reciprocating rubs, the water contact angle was less than 100°.

C: After 15,000 reciprocating rubs, the water contact angle was 100° or more, but after 20,000 reciprocating rubs, the water contact angle was less than 100°.

D: After 10,000 reciprocating rubs, the water contact angle was 100° or more, but after 15,000 reciprocating rubs, the water contact angle was less than 100°.

E: The water contact angle was less than 100° after 10,000 reciprocating rubs.

(vi) Abrasion Resistance 2 (Steel Wool Resistance)

A pressure-sensitive adhesive film was placed in a Gakushin tester according to JIS L0849:2013 such that a first hard coat thereof was a surface. Subsequently, a steel wool of #0000 was attached to a friction terminal of the Gakushin tester, and a load of 500 g was then placed. After 100 reciprocating rubs of a surface of the test piece, the rubbed portion was visually observed. When no scratch was observed, an operation of additionally performing 100 reciprocating rubs and then visually observing the rubbed portion was repeated, and steel wool resistance was evaluated according to the following criteria.

A: No scratch was observed even after 500 reciprocating rubs.

B: No scratch was observed after 400 reciprocating rubs, but a scratch could be observed after 500 reciprocating rubs.

C: No scratch was observed after 300 reciprocating rubs, but a scratch could be observed after 400 reciprocating rubs.

D: No scratch was observed after 200 reciprocating rubs, but a scratch could be observed after 300 reciprocating rubs.

E: No scratch was observed after 100 reciprocating rubs, but a scratch could be observed after 200 reciprocating rubs.

F: A scratch could be observed after 100 reciprocating rubs.

(vii) Pencil Hardness

The pencil hardness of a first hard coat surface of a pressure-sensitive adhesive film was measured according to JIS K5600-5-4 using a pencil "UNI" (trade name) available from Mitsubishi Pencil Co., Ltd. under a condition of a load of 750 g.

(viii) Surface Smoothness (Surface Appearance)

While a first hard coat surface of a pressure-sensitive adhesive film was irradiated with light of a fluorescent lamp by changing an incident angle in various directions, the surface was visually observed, and surface smoothness (surface appearance) was evaluated according to the following criteria.

◎ (very good): The surface had no undulation or scratch. Even when the surface was viewed closely by letting light pass therethrough, there was no impression of cloudiness.

○ (good): When being viewed closely by letting light pass therethrough, the surface had a portion giving an impression of slight cloudiness.

Δ (slightly poor): When being viewed closely, the surface had slightly recognized undulations and scratches. The surface also gave an impression of cloudiness.

X (poor): The surface had a large number of recognized undulations and scratches. The surface also gave a definite impression of cloudiness.

(ix) Square Lattice Pattern Test (Adhesiveness)

According to JIS K5600-5-6:1999, a square lattice pattern cut consisting of 100 cells (1 cell=1 mm×1 mm) was formed on a pressure-sensitive adhesive film from a first hard coat surface side. Thereafter, a tape for an adhesion test was pasted on the square lattice pattern, was rubbed with fingers, and was then peeled off. The criteria for evaluation were in accordance with Table 1 in the above JIS standard.

Classification 0: Edges of the cuts were completely smooth, and none of the squares of the lattice was peeled off.

Classification 1: Small peeling of a coat was observed at intersections of the cuts. A cross-cut area of clearly not more than 5% was affected.

Classification 2: A coat was peeled off along edges and/or at intersections of the cuts. A cross-cut area of clearly more than 5% but not more than 15% was affected.

Classification 3: A coat was largely peeled off along edges of the cuts partially or entirely, and/or various parts of squares were peeled off partially or entirely. A cross-cut area of clearly more than 15% but not more than 35% was affected.

Classification 4: A coat was largely peeled off along edges of the cuts partially or entirely, and/or some parts of squares were peeled off partially or entirely. A cross-cut area of clearly more than 35% but not more than 65% was affected.

Classification 5: A case where the degree of peeling was more than that in Classification 4 was classified into this classification.

(x) Minimum Bending Radius

With reference to bending formability (B method) in JIS-K6902:2007, a test piece was conditioned at a temperature of 23° C.±2° C. and a relative humidity of 50±5% for 24 hours, and thereafter the test piece was bent at a bending temperature of 23° C.±2° C. at a bending line in a direction perpendicular to the machine direction of a pressure-sensitive adhesive film such that a first hard coat of the pressure-sensitive adhesive film was on the outer side to form a curved surface. The radius of a front face having the smallest radius of a front face among shaping jigs with no crack generated was defined as the minimum bending radius. The "front face" has the same meaning as the term regarding a shaping jig in the B method defined in Paragraph 18.2 in JIS K6902:2007.

(xi) Cutting Processability (Condition of Curved Cutting-Processed Line)

A cut hole of a true circle with a diameter of 2 mm and a cut hole of a true circle with a diameter of 0.5 mm were formed in a pressure-sensitive adhesive film using a router processing machine automatically controlled by a computer. A mill used at this time was a four-bladed super-hard-alloy mill with nicks, having a cylindrically round tip, and a blade diameter was appropriately selected according to a portion to be processed. Subsequently, the cut hole with a diameter of 2 mm was observed for a cut edge surface thereof visually or with a microscope (100 times), and the cut edge surface was evaluated according to the following criteria. Similarly, the cut hole with a diameter of 0.5 mm was observed for a cut edge surface thereof visually or with a microscope (100 times) and the cut edge surface was evaluated according to the following criteria. The result of the former case and the result of the latter case were listed in this order in Tables.

◎ (very good): No crack or burr was observed even with a microscope.

○ (good): No crack was observed even with a microscope. However, a burr was observed.

Δ (slightly poor): No crack was observed visually. However, a crack was observed with a microscope.

X (poor): A crack was observed even visually.

(xii) Shrinkage-Starting Temperature (Dimensional Stability Against Heat)

A temperature-test piece length curve was determined in accordance with HS K7197:1991. Using this curve, an inflection point at which an increasing (expanding) trend in the test piece length shifted to a decreasing (shrinking) trend (a temperature at which the test piece length became maximum) on the lowest temperature side within a range of 20° C. to the glass transition temperature of a raw material resin was calculated as a shrinkage-starting temperature. A thermomechanical analyzer (TMA) "EXSTAR 6100 (trade name)" available from Seiko Instruments Inc. was used for the measurement. A test piece was taken such that the size was 20 mm in length and 10 mm in width and the machine direction (MD) of a film was in a longitudinal direction of the test piece. Conditioning of the test piece was performed at a temperature of 23° C.±2° C. and a relative humidity of 50±5% for 24 hours, and conditioning at the maximum measurement temperature was not performed in order to measure dimensional stability as a physical property value of a film. A distance between chucks and a tensile load were set to 10 mm and 4.0 mN/mm², respectively. In a temperature program, the temperature was held at a temperature of 20° C. for 3 minutes, and was then raised to a temperature of 300° C. at a temperature rising rate of 5° C./min.

(xiii) Air Bleedability

A test piece having a size of 30 cm in long side×20 cm in short side was taken from a pressure-sensitive adhesive film such that the machine direction of the pressure-sensitive adhesive film was in the long side direction of the test piece. This test piece was pasted on a glass plate (a float glass plate with a thickness of 3 mm defined in HS R3202:2011, available from K.K. Test Piece; this also applies to the following) placed on a table by hand from one end part thereof in the short side toward the other end part. A bubble entrainment state and presence or absence of poor appearance such as bulge at this time were visually observed and evaluated according to the following criteria.

○ (good): No bulge due to bubble entrainment was observed.

Δ (slightly poor): Bulges due to bubble entrainment were observed. However, by rubbing an upper surface of the film with fingers, bubbles were easily squeezed out and the bulges could be eliminated.

X (poor): Bulges due to bubble entrainment were observed. Furthermore, even by rubbing an upper surface of the film with fingers, there were bulges in which bubbles could not be squeezed out and eliminated.

(xiv) Heat Cycle Reliability

A sample in which a pressure-sensitive adhesive film was pasted on a glass plate in a similar manner to the above test (xiii) was subjected to a 13-cycle treatment in which one cycle included exposing the sample to an environment of a temperature of −40° C. for 30 minutes and then exposing the sample to an environment of a temperature of 80° C. for 30 minutes using a thermal impact tester (having no humidity control mechanism). After the treatment, the sample was visually observed and evaluated according to the following criteria.

○ (good): No lifting of a pressure-sensitive adhesive film from a glass plate (portion where the pressure-sensitive adhesive film was peeled from the glass plate) was observed.

Δ (slightly poor): Lifting of a pressure-sensitive adhesive film from a glass plate was observed on an end part of the pressure-sensitive adhesive film.

X (poor): Lifting of a pressure-sensitive adhesive film from a glass plate was observed entirely.

(xv) Appearance Sustainability at Peeling

A pressure-sensitive adhesive film was pasted on a glass plate in a similar manner to the above test (xiii), was then peeled off from the glass plate by hand, and was evaluated according to the following criteria.

○ (good): A film could be easily peeled without having any adhesive residue left. No breakage or plastic deformation was caused on the film.

Δ (slightly poor): A film could be peeled without having any adhesive residue left. However, breakage and plastic deformation were caused on the film.

X (poor): A pressure-sensitive adhesive residue was left when a film was peeled. Furthermore, breakage and plastic deformation were caused on the film.

Raw Materials Used (A) Polyfunctional (Meth)Acrylate (A-1) Dipentaerythritol hexaacrylate (hexafunctional)

(A-2) Pentaerythritol triacrylate (trifunctional)

(B) Water-Repelling Agent (B-1) An acryloyl group-containing fluoropolyether water-repelling agent "KY-1203" (trade name) available from Shin-Etsu Chemical Co., Ltd.: solid content 20% by mass (B-2) A methacryloyl group-containing fluoropolyether water-repelling agent "FOMBLIN MT70" (trade name) available from Solvay S.A.: solid content 70% by mass (C) Silane Coupling Agent (C-1) N-2-(aminoethyl)-3-aminopropylmethyldimethoxysilane "KBM-602" (trade name) available from Shin-Etsu Chemical Co., Ltd.

(C-2) N-2-(aminoethyl)-3-aminopropyltrimethoxysilane "KBM-603" (trade name) available from Shin-Etsu Chemical Co., Ltd.

(C-3) 3-aminopropyltrimethoxysilane "KBM-903" (trade name) available from Shin-Etsu Chemical Co., Ltd.

(C-4) 3-mercaptopropylmethyldimethoxysilane "KBM-802" (trade name) available from Shin-Etsu Chemical Co., Ltd.

(C-5) 3-glycidoxypropyltrimethoxysilane "KBM-403" (trade name) available from Shin-Etsu Chemical Co., Ltd.

(D) Inorganic Fine Particles Having an Average Particle Size of 1 to 300 nm (D-1) Silica fine particles the surfaces of which have been treated with a silane coupling agent having a vinyl group and which have an average particle size of 20 nm (E) Leveling Agent (E-1) A silicone-acrylate copolymer leveling agent "DISPARLON NSH-8430HF" (trade name) available from Kusumoto Chemicals, Ltd.: solid content 10% by mass (E-2) A silicone-acrylate copolymer leveling agent "BYK-3550" (trade name) available from BYK Japan KK: solid content 52% by mass (E-3) An acrylate polymer leveling agent "BYK-399" (trade name) available from BYK Japan KK: solid content 100% by mass (E-4) A silicone leveling agent "DISPARLON LS-480" (trade name) available from Kusumoto Chemicals, Ltd.: solid content 100% by mass (F) Optional Component (F-1) A phenyl ketone photopolymerization initiator (1-hydroxycyclohexyl phenyl ketone) "SB-PI714" (trade name) available from Shuang Bang Industrial Corp.

(F-2) 1-methoxy-2-propanol (H1) First Hard Coat Forming Coating Material (H1-1) A coating material was obtained by mixing and stirring 100 parts by mass of the (A-1), 2 parts by mass (0.40 parts by mass in terms of solid content) of the (B-1), 0.06 parts by mass (0.042 parts by mass in terms of solid content) of the (B-2), 0.5 parts by mass of the (C-1), 4 parts by mass of the (F-1), and 100 parts by mass of the (F-2). Table 1 shows components and blending amounts thereof. In addition, values in terms of solid content are listed for the (B-1) and the component (B-2) in Tables.

(H1-2 to H1-16) Coating materials were obtained in a similar manner to the (H1-1) except that the components and blending amounts thereof were changed as shown in Table 1 or 2.

TABLE 1

| Component (part by mass) | First hard coat forming coating material | | | | | | | |
|---|---|---|---|---|---|---|---|---|
| | (H1-1) | (H1-2) | (H1-3) | (H1-4) | (H1-5) | (H1-6) | (H1-7) | (H1-8) |
| (A-1) | 100 | 100 | 100 | 100 | 100 | 100 | 100 | 100 |
| (B-1) | 0.40 | 0.080 | 0.80 | 2.0 | — | 8.0 | 0.40 | 0.40 |
| (B-2) | 0.042 | 0.0084 | 0.084 | 0.21 | — | 0.84 | 0.042 | 0.042 |
| (C-1) | 0.5 | 0.5 | 0.5 | 0.5 | 0.5 | 0.5 | 0.5 | — |
| (C-2) | — | — | — | — | — | — | — | — |
| (C-3) | — | — | — | — | — | — | — | — |
| (C-4) | — | — | — | — | — | — | — | — |
| (C-5) | — | — | — | — | — | — | — | — |
| (D-1) | — | — | — | — | — | — | 20 | — |
| (F-1) | 4 | 4 | 4 | 4 | 4 | 4 | 4 | 4 |
| (F-2) | 100 | 100 | 100 | 100 | 100 | 80 | 130 | 100 |

TABLE 2

| Component (part by mass) | First hard coat forming coating material | | | | | | | |
|---|---|---|---|---|---|---|---|---|
| | (H1-9) | (H1-10) | (H1-11) | (H1-12) | (H1-13) | (H1-14) | (H1-15) | (H1-16) |
| (A-1) | 100 | 100 | 100 | 100 | 100 | 100 | 100 | 100 |
| (B-1) | 0.40 | 0.40 | 0.40 | 0.40 | 0.40 | 0.40 | 0.40 | 0.40 |
| (B-2) | 0.042 | 0.042 | 0.042 | 0.042 | 0.042 | 0.042 | 0.042 | 0.042 |
| (C-1) | 0.01 | 0.1 | 1 | 5 | — | — | — | — |
| (C-2) | — | — | — | — | 0.5 | — | — | — |
| (C-3) | — | — | — | — | — | 0.5 | — | — |
| (C-4) | — | — | — | — | — | — | 0.5 | — |
| (C-5) | — | — | — | — | — | — | — | 0.5 |
| (D-1) | — | — | — | — | — | — | — | — |
| (F-1) | 4 | 4 | 4 | 4 | 4 | 4 | 4 | 4 |
| (F-2) | 100 | 100 | 100 | 100 | 100 | 100 | 100 | 100 |

(H2) Second Hard Coat Forming Coating Material (H2-1) A coating material was obtained by mixing and stirring 100 parts by mass of the (A-2), 140 parts by mass of the (D-1), 2 parts by mass (0.2 parts by mass in terms of solid content) of the (E-1), 17 parts by mass of the (F-1), and 200 parts by mass of the (F-2). Table 3 shows components and blending amounts thereof. In addition, values in terms of solid content are listed for the (E-1) in Tables. (H2-2 to H2-15) Coating materials were obtained in a similar manner to the (H2-1) except that the components and blending amounts thereof were changed as shown in Table 3 or 4.

[Table 3]

TABLE 3

| Component (part by mass) | Second hard coat forming coating material | | | | | | |
|---|---|---|---|---|---|---|---|
| | (H2-1) | (H2-2) | (H2-3) | (H2-4) | (H2-5) | (H2-6) | (H2-7) |
| (A-2) | 100 | 100 | 100 | 100 | 100 | 100 | 100 |
| (D-1) | 140 | 140 | 140 | 140 | 140 | 140 | 140 |
| (E-1) | 0.2 | — | 0.1 | 0.4 | 0.6 | 1.5 | — |
| (E-2) | — | — | — | — | — | — | 0.2 |
| (E-3) | — | — | — | — | — | — | — |
| (E-4) | — | — | — | — | — | — | — |
| (F-1) | 17 | 17 | 17 | 17 | 17 | 17 | 17 |
| (F-2) | 200 | 200 | 200 | 200 | 200 | 200 | 200 |

TABLE 4

| Component (part by mass) | Second hard coat forming coating material | | | | | | | |
|---|---|---|---|---|---|---|---|---|
| | (H2-8) | (H2-9) | (H2-10) | (H2-11) | (H2-12) | (H2-13) | (H2-14) | (H2-15) |
| (A-2) | 100 | 100 | 100 | 100 | 100 | 100 | 100 | 100 |
| (D-1) | 140 | 140 | 140 | 80 | 200 | 30 | 400 | — |
| (E-1) | — | — | — | 0.2 | 0.2 | 0.2 | 0.2 | 0.2 |
| (E-2) | 0.4 | — | — | — | — | — | — | — |

TABLE 4-continued

| Component (part by mass) | Second hard coat forming coating material | | | | | | | |
|---|---|---|---|---|---|---|---|---|
| | (H2-8) | (H2-9) | (H2-10) | (H2-11) | (H2-12) | (H2-13) | (H2-14) | (H2-15) |
| (E-3) | — | 0.3 | — | — | — | — | — | — |
| (E-4) | — | — | 0.3 | — | — | — | — | — |
| (F-1) | 17 | 17 | 17 | 17 | 17 | 17 | 17 | 17 |
| (F-2) | 200 | 200 | 200 | 155 | 250 | 120 | 420 | 200 |

(P) Transparent Resin Film (P-1) Using an apparatus equipped with a two-kind/three-layer multimanifold-type co-extrusion T-die and a winder having a mechanism for pressing a melted film with a mirror-finished roll and a mirror-finished belt, a two-kind/three-layer multilayer resin film in which both outer layers (α1 layer and α2 layer) were formed of a poly(meth)acrylimide "PLEXIMID TT50" (trade name) available from Evonik Industry AG and an intermediate layer (β layer) was formed of an aromatic polycarbonate "CALIBRE 301-4" (trade name) available from Sumika Styron Polycarbonate Limited was continuously co-extruded from a co-extrusion T-die. Subsequently, the co-extruded product was supplied and introduced between the rotating mirror-finished roll and the mirror-finished belt circulating along an outer circumferential surface of the mirror-finished roll such that the α1 layer was on the mirror-finished roll side, and was pressed to obtain a transparent resin film having a total thickness of 250 µm, a layer thickness of the α1 layer of 80 µm, a layer thickness of the β layer of 90 µm, and a layer thickness of the α2 layer of 80 µm. As setting conditions at this time, a set temperature of the T-die was 300° C., a set temperature of the mirror-finished roll was 130° C., a set temperature of the mirror-finished belt was 120° C., and a wind-up speed was 6.5 m/min.

(P-2) A transparent resin film was obtained in a similar manner to the (P-1) except that the layer thickness of the α1 layer, the layer thickness of the β layer, and the layer thickness of the α2 layer were changed to 60 µm, 130 µm, and 60 µm, respectively.

(P-3) A transparent resin film was obtained in a similar manner to the (P-1) except that the layer thickness of the α1 layer, the layer thickness of the β layer, and the layer thickness of the α2 layer were changed to 40 µm, 170 µm, and 40 µm, respectively.

(P-4) A biaxially stretched polyethylene terephthalate film "DIAFOIL" (trade name) available from Mitsubishi Plastics, Inc.: thickness 250 µm (P-5) An acrylic resin film "TECHNOLLOY S001G" (trade name) available from Sumitomo Chemical Co., Ltd.: thickness 250 µm (P-6) Using an apparatus equipped with a single-layer T-die and a winder having a mechanism for pressing a melted film with a mirror-finished roll and a mirror-finished belt, an aromatic polycarbonate "CALIBRE 301-4" (trade name) available from Sumika Styron Polycarbonate Limited was continuously extruded from the T-die. The extruded product was supplied and introduced between the rotating mirror-finished roll and the mirror-finished belt circulating along an outer circumferential surface of the mirror-finished roll, and was pressed to obtain a transparent resin film having a total thickness of 250 µm. As setting conditions at this time, a set temperature of the T-die was 320° C., a set temperature of the mirror-finished roll was 140° C., a set temperature of the mirror-finished belt was 120° C., and a wind-up speed was 5.6 m/min.

(γ) Pressure-Sensitive Adhesive (γ-1) A pressure-sensitive adhesive was obtained by mixing and stirring 100 parts by mass of an addition reaction type silicone pressure-sensitive adhesive "KR-3704" (trade name) available from Shin-Etsu Chemical Co., Ltd., 0.5 parts by mass of a platinum compound addition reaction catalyst "CAT-PL-50T" (trade name) available from Shin-Etsu Chemical Co., Ltd., and 20 parts by mass of toluene.

Example 1

Both the surfaces of the transparent resin film of the (P-1) were subjected to a corona discharge treatment. Both the surfaces had a wetting index of 64 mN/m. Subsequently, the second hard coat forming coating material of the (H2-1) was applied onto a surface of the α1 layer side using a die-type applicator such that the wet thickness was 40 µm (thickness after curing: 22 µm). Subsequently, the resulting product was caused to pass through a drying furnace set at an inner temperature of 90° C. at a line speed such that the time required to pass from the inlet to the outlet was one minute. Thereafter, the resulting product was treated using a curing apparatus having a high-pressure mercury lamp type ultraviolet irradiator 1 and a mirror-finished metal roll 2 having a diameter of 25.4 cm disposed opposite to each other (see FIG. 1) under conditions of a temperature of the mirror-finished metal roll 2 of 90° C. and an integrated amount of light of 80 mJ/cm². In FIG. 1, the reference sign 3 represents a web, and the reference sign 4 represents a holding angle. As a result, the wet coat of the (H2-1) became a coat in a set-to-touch state. Subsequently, the first hard coat forming coating material of the (H1-1) was applied onto the coat of the (H2-1) in a set-to-touch state using a die type applicator such that the wet thickness of the (H1-1) was 4 µm (thickness after curing: 2 µm). Subsequently, the resulting product was caused to pass through a drying furnace set at an inner temperature of 80° C. at a line speed such that the time required to pass from the inlet to the outlet was one minute. Thereafter, the resulting product was treated using a curing apparatus having a high-pressure mercury lamp type ultraviolet irradiator 1 and a mirror-finished metal roll 2 having a diameter of 25.4 cm disposed opposite to each other (see FIG. 1) under conditions of a temperature of the mirror-finished metal roll 2 of 60° C. and an integrated amount of light of 480 mJ/cm² to form a first hard coat and a second hard coat. Subsequently, a third hard coat was formed on a surface of the α2 layer side with the same coating material as in forming the second hard coat (the (H2-1) in Example 1) using a die-type applicator such that the thickness after curing was 22 µm. The pressure-sensitive adhesive of the (γ-1) was applied onto the formed third hard coat such that the thickness after curing was 30 µm using an applicator, and was heated and cured under conditions of 130° C. for 1 minute to obtain a pressure-sensitive adhesive film. This pressure-sensitive adhesive film was subjected to tests (i) to (xv) for measurement and evaluation of physical properties. The results are shown in Table 5.

Examples 2 to 16

Manufacture of a pressure-sensitive adhesive film and measurement and evaluation of physical properties thereof were performed in a similar manner to Example 1 except that the coating material shown in any one of Tables 5 to 7 was used in place of the (H1-1). The results are shown in any one of Tables 5 to 7.

Examples 17 to 29

Manufacture of a pressure-sensitive adhesive film and measurement and evaluation of physical properties thereof were performed in a similar manner to Example 1 except that the coating material shown in any one of Tables 7 to 9 was used in place of the (H2-1). The results are shown in any one of Tables 7 to 9.

Examples 30 to 34

Manufacture of a pressure-sensitive adhesive film and measurement and evaluation of physical properties thereof were performed in a similar manner to Example 1 except that the transparent resin film shown in Table 9 was used in place of the (P-1). The results are shown in Table 9.

Example 35

Manufacture of a pressure-sensitive adhesive film and measurement and evaluation of physical properties thereof were performed in a similar manner to Example 1 except that the thickness of the pressure-sensitive adhesive layer after curing was changed to 12 μm. The results are shown in Table 9.

Examples 36 to 39

Manufacture of a pressure-sensitive adhesive film and measurement and evaluation of physical properties thereof were performed in a similar manner to Example 1 except that the thickness of the first hard coat after curing was changed as shown in Table 10. The results are shown in Table 10.

Examples 40 to 43

Manufacture of a pressure-sensitive adhesive film and measurement and evaluation of physical properties thereof were performed in a similar manner to Example 1 except that the thickness of the second hard coat after curing was changed as shown in Table 10 or 11 and that the thickness of the third hard coat after curing was changed to the same thickness as the thickness of the second hard coat after curing. The results are shown in Table 10 or 11.

Examples 44 to 58

Manufacture of a pressure-sensitive adhesive film and measurement and evaluation of physical properties thereof were performed in a similar manner to Example 1 except that the manufacturing conditions of the pressure-sensitive adhesive film were changed as shown in any one of Tables 11 to 13. The results are shown in any one of Tables 11 to 13.

TABLE 5

|  |  | Example 1 | Example 2 | Example 3 | Example 4 | Example 5 | Example 6 | Example 7 |
|---|---|---|---|---|---|---|---|---|
| Components | First hard coat forming coating | (H1-1) | (H1-2) | (H1-3) | (H1-4) | (H1-5) | (H1-6) | (H1-7) |
|  | Second hard coat forming coating | (H2-1) | (H2-1) | (H2-1) | (H2-1) | (H2-1) | (H2-1) | (H2-1) |
|  | Transparent resin film | (P-1) | (P-1) | (P-1) | (P-1) | (P-1) | (P-1) | (P-1) |
| Evaluation results | Total light transmittance % | 89.9 | 89.9 | 89.8 | 89.4 | 89.9 | 88.8 | 89.1 |
|  | Haze % | 0.3 | 0.2 | 0.4 | 1.4 | 0.2 | 3.6 | 0.4 |
|  | Yellowness index | 0.3 | 0.3 | 0.3 | 0.3 | 0.3 | 0.3 | 0.3 |
|  | Water contact angle deg | 116 | 115 | 116 | 118 | 72.1 | 119 | 116 |
|  | Abrasion resistance 1 | A | B | A | A | E | A | E |
|  | Abrasion resistance 2 | A | A | A | A | D | A | F |
|  | Pencil hardness | 7H | 7H | 7H | 7H | 5H | 7H | 7H |
|  | Surface smoothness | ◎ | ◎ | ◎ | ◎ | ◎ | ◎ | ◎ |
|  | Square lattice pattern test | Classification 0 | Classification 0 | Classification 0 | Classification 0 | Classification 0 | Classification 0 | Classification 0 |
|  | Minimum bending radius mm | 30 | 30 | 30 | 30 | 30 | 30 | 30 |
|  | Cutting processability | ◎-◎ | ◎-◎ | ◎-◎ | ◎-◎ | ◎-◎ | ◎-◎ | ◎-◎ |
|  | Shrinkage-starting temperature ° C. | 140 | 140 | 140 | 140 | 140 | 140 | 140 |
|  | Air bleedability | ○ | ○ | ○ | ○ | ○ | ○ | ○ |
|  | Heat cycle reliability | ○ | ○ | ○ | ○ | ○ | ○ | ○ |
|  | Appearance sustainability at peeling | ○ | ○ | ○ | ○ | ○ | ○ | ○ |

TABLE 6

| | | Example 8 | Example 9 | Example 10 | Example 11 | Example 12 | Example 13 | Example 14 |
|---|---|---|---|---|---|---|---|---|
| Components | First hard coat forming coating | (H1-8) | (H1-9) | (H1-10) | (H1-11) | (H1-12) | (H1-13) | (H1-14) |
| | Second hard coat forming coating | (H2-1) | (H2-1) | (H2-1) | (H2-1) | (H2-1) | (H2-1) | (H2-1) |
| | Transparent resin film | (P-1) | (P-1) | (P-1) | (P-1) | (P-1) | (P-1) | (P-1) |
| Evaluation results | Total light transmittance % | 89.9 | 89.9 | 89.9 | 89.9 | 89.9 | 89.9 | 89.9 |
| | Haze % | 0.3 | 0.3 | 0.3 | 0.3 | 0.3 | 0.3 | 0.3 |
| | Yellowness index | 0.3 | 0.3 | 0.3 | 0.3 | 0.3 | 0.3 | 0.3 |
| | Water contact angle deg | 116 | 116 | 116 | 116 | 116 | 116 | 116 |
| | Abrasion resistance 1 | A | A | A | A | A | A | A |
| | Abrasion resistance 2 | A | A | A | A | A | A | A |
| | Pencil hardness | 7H | 7H | 7H | 7H | 7H | 7H | 7H |
| | Surface smoothness | ◎ | ◎ | ◎ | ◎ | ◎ | ◎ | ◎ |
| | Square lattice pattern test | Classification 4 | Classification 1 | Classification 0 | Classification 0 | Classification 0 | Classification 0 | Classification 0 |
| | Minimum bending radius mm | 30 | 30 | 30 | 30 | 30 | 30 | 30 |
| | Cutting processability | ◎-◎ | ◎-◎ | ◎-◎ | ◎-◎ | ◎-◎ | ◎-◎ | ◎-◎ |
| | Shrinkage-starting temperature ° C. | 140 | 140 | 140 | 140 | 140 | 140 | 140 |
| | Air bleedability | ○ | ○ | ○ | ○ | ○ | ○ | ○ |
| | Heat cycle reliability | ○ | ○ | ○ | ○ | ○ | ○ | ○ |
| | Appearance sustainability at peeling | ○ | ○ | ○ | ○ | ○ | ○ | ○ |

TABLE 7

| | | Example 15 | Example 16 | Example 17 | Example 18 | Example 19 | Example 20 | Example 21 |
|---|---|---|---|---|---|---|---|---|
| Components | First hard coat forming coating | (H1-15) | (H1-16) | (H1-1) | (H1-1) | (H1-1) | (H1-1) | (H1-1) |
| | Second hard coat forming coating | (H2-1) | (H2-1) | (H2-2) | (H2-3) | (H2-4) | (H2-5) | (H2-6) |
| | Transparent resin film | (P-1) | (P-1) | (P-1) | (P-1) | (P-1) | (P-1) | (P-1) |
| Evaluation results | Total light transmittance % | 89.9 | 89.9 | 89.9 | 89.9 | 89.9 | 89.9 | 89.9 |
| | Haze % | 0.3 | 0.3 | 0.4 | 0.3 | 0.3 | 0.3 | 0.6 |
| | Yellowness index | 0.3 | 0.3 | 0.3 | 0.3 | 0.3 | 0.3 | 0.3 |
| | Water contact angle deg | 116 | 116 | 116 | 116 | 116 | 116 | 116 |
| | Abrasion resistance 1 | A | A | B | A | A | A | A |
| | Abrasion resistance 2 | A | A | B | A | A | A | A |
| | Pencil hardness | 7H | 7H | 7H | 7H | 7H | 7H | 7H |
| | Surface smoothness | ◎ | ◎ | ○ | ○ | ◎ | ◎ | ◎ |
| | Square lattice pattern test | Classification 0 | Classification 3 | Classification 0 | Classification 0 | Classification 0 | Classification 0 | Classification 2 |
| | Minimum bending radius mm | 30 | 20 | 30 | 30 | 30 | 30 | 30 |
| | Cutting processability | ◎-◎ | ◎-◎ | ◎-◎ | ◎-◎ | ◎-◎ | ◎-◎ | ◎-◎ |
| | Shrinkage-starting temperature ° C. | 140 | 140 | 140 | 140 | 140 | 140 | 140 |
| | Air bleedability | ○ | ○ | ○ | ○ | ○ | ○ | ○ |
| | Heat cycle reliability | ○ | ○ | ○ | ○ | ○ | ○ | ○ |
| | Appearance sustainability at peeling | ○ | ○ | ○ | ○ | ○ | ○ | ○ |

TABLE 8

|  |  | Example 22 | Example 23 | Example 24 | Example 25 | Example 26 | Example 27 | Example 28 | Example 28-2 |
|---|---|---|---|---|---|---|---|---|---|
| Components | First hard coat forming coating | (H1-1) | (H1-1) | (H1-1) | (H1-1) | (H1-1) | (H1-1) | (H1-1) | (H1-1) |
|  | Second hard coat forming coating | (H2-7) | (H2-8) | (H2-9) | (H2-10) | (H2-11) | (H2-12) | (H2-13) | (H2-15) |
|  | Transparent resin film | (P-1) | (P-1) | (P-1) | (P-1) | (P-1) | (P-1) | (P-1) | (P-1) |
| Evaluation results | Total light transmittance % | 89.9 | 89.9 | 89.9 | 89.9 | 90.1 | 89.0 | 90.1 | 90.5 |
|  | Haze % | 0.3 | 0.3 | 0.6 | 0.6 | 0.3 | 0.7 | 0.2 | 0.1 |
|  | Yellowness index | 0.3 | 0.3 | 0.3 | 0.3 | 0.3 | 0.3 | 0.3 | 0.3 |
|  | Water contact angle deg | 116 | 116 | 116 | 116 | 116 | 116 | 116 | 116 |
|  | Abrasion resistance 1 | A | A | A | A | A | A | A | A |
|  | Abrasion resistance 2 | A | A | A | A | A | A | A | A |
|  | Pencil hardness | 7H | 7H | 7H | 7H | 6H | 8H | 3H | H |
|  | Surface smoothness | ◎ | ◎ | ○ | ◎ | ◎ | ◎ | ◎ | ◎ |
|  | Square lattice pattern test | Classification 0 | Classification 0 | Classification 0 | Classification 2 | Classification 0 | Classification 0 | Classification 0 | Classification 0 |
|  | Minimum bending radius mm | 30 | 30 | 30 | 30 | 20 | 40 | 20 | 15 |
|  | Cutting processability | ◎-◎ | ◎-◎ | ◎-◎ | ◎-◎ | ◎-◎ | ◎-◎ | ◎-◎ | ◎-◎ |
|  | Shrinkage-starting temperature ° C. | 140 | 140 | 140 | 140 | 140 | 140 | 140 | 140 |
|  | Air bleedability | ○ | ○ | ○ | ○ | ○ | ○ | ○ | ○ |
|  | Heat cycle reliability | ○ | ○ | ○ | ○ | ○ | ○ | ○ | ○ |
|  | Appearance sustainability at peeling | ○ | ○ | ○ | ○ | ○ | ○ | ○ | ○ |

TABLE 9

|  |  | Example 29 | Example 30 | Example 31 | Example 32 | Example 33 | Example 34 | Example 35 |
|---|---|---|---|---|---|---|---|---|
| Components | First hard coat forming coating | (H1-1) | (H1-1) | (H1-1) | (H1-1) | (H1-1) | (H1-1) | (H1-1) |
|  | Second hard coat forming coating | (H2-14) | (H2-1) | (H2-1) | (H2-1) | (H2-1) | (H2-1) | (H2-1) |
|  | Transparent resin film | (P-1) | (P-2) | (P-3) | (P-4) | (P-5) | (P-6) | (P-1) |
| Evaluation results | Total light transmittance % | 87.0 | 89.9 | 89.9 | 89.1 | 89.9 | 89.6 | 90.1 |
|  | Haze % | 3.6 | 0.3 | 0.3 | 0.4 | 0.4 | 0.4 | 0.3 |
|  | Yellowness index | 0.3 | 0.3 | 0.3 | 0.3 | 0.3 | 0.4 | 0.3 |
|  | Water contact angle deg | 116 | 116 | 116 | 116 | 116 | 116 | 116 |
|  | Abrasion resistance 1 | A | A | A | A | A | A | A |
|  | Abrasion resistance 2 | A | A | A | A | A | A | A |
|  | Pencil hardness | 9H | 7H | 5H | 4H | 7H | 2H | 7H |
|  | Surface smoothness | ◎ | ◎ | ◎ | ◎ | ◎ | ◎ | ◎ |
|  | Square lattice pattern test | Classification 0 | Classification 0 | Classification 0 | Classification 0 | Classification 0 | Classification 0 | Classification 0 |
|  | Minimum bending radius mm | 50 | 30 | 30 | 30 | 40 | 30 | 30 |
|  | Cutting processability | ◎-◎ | ◎-◎ | ◎-◎ | ◎-◎ | ◎-◎ | ◎-◎ | ◎-◎ |
|  | Shrinkage-starting temperature ° C. | 140 | 140 | 140 | 70 | 100 | 130 | 140 |
|  | Air bleedability | ○ | ○ | ○ | ○ | ○ | ○ | ○ |
|  | Heat cycle reliability | ○ | ○ | ○ | ○ | ○ | ○ | ○ |
|  | Appearance sustainability at peeling | ○ | ○ | ○ | ○ | ○ | ○ | ○ |

TABLE 10

|  |  | Example 36 | Example 37 | Example 38 | Example 39 | Example 40 | Example 41 |
| --- | --- | --- | --- | --- | --- | --- | --- |
| First hard coat | Thickness μm | 0.5 | 1 | 3 | 5 | 2 | 2 |
|  | Predrying temperature ° C. | 80 | 80 | 80 | 80 | 80 | 80 |
|  | Predrying time minute | 1 | 1 | 1 | 1 | 1 | 1 |
|  | Preheating for irradiation ° C. | 60 | 60 | 60 | 60 | 60 | 60 |
|  | Integrated amount of light mJ/cm$^2$ | 480 | 480 | 480 | 480 | 480 | 480 |
| Second hard coat | Thickness μm | 22 | 22 | 22 | 22 | 15 | 18 |
|  | Predrying temperature ° C. | 90 | 90 | 90 | 90 | 90 | 90 |
|  | Predrying time minute | 1 | 1 | 1 | 1 | 1 | 1 |
|  | Preheating for irradiation ° C. | 90 | 90 | 90 | 90 | 90 | 90 |
|  | Integrated amount of light mJ/cm$^2$ | 80 | 80 | 80 | 80 | 80 | 80 |
| Evaluation results | Total light transmittance % | 89.9 | 89.9 | 89.9 | 89.9 | 90.1 | 89.8 |
|  | Haze % | 0.3 | 0.3 | 0.5 | 1.0 | 0.3 | 0.3 |
|  | Yellowness index | 0.3 | 0.3 | 0.3 | 0.3 | 0.3 | 0.3 |
|  | Water contact angle deg | 116 | 116 | 116 | 116 | 116 | 116 |
|  | Abrasion resistance 1 | B | A | A | A | A | A |
|  | Abrasion resistance 2 | B | A | A | A | A | A |
|  | Pencil hardness | 5H | 7H | 7H | 7H | 5H | 7H |
|  | Surface smoothness | ◎ | ◎ | ◎ | ◎ | ◎ | ◎ |
|  | Square lattice pattern test | Classification 0 | Classification 0 | Classification 0 | Classification 2 | Classification 0 | Classification 0 |
|  | Minimum bending radius mm | 30 | 30 | 30 | 40 | 20 | 30 |
|  | Cutting processability | ◎-◎ | ◎-◎ | ◎-◎ | ◎-◎ | ◎-◎ | ◎-◎ |
|  | Shrinkage-starting temperature ° C. | 140 | 140 | 140 | 140 | 140 | 140 |
|  | Air bleedability | ○ | ○ | ○ | ○ | ○ | ○ |
|  | Heat cycle reliability | ○ | ○ | ○ | ○ | ○ | ○ |
|  | Appearance sustainability at peeling | ○ | ○ | ○ | ○ | ○ | ○ |

TABLE 11

|  |  | Example 42 | Example 43 | Example 44 | Example 1 | Example 45 | Example 46 |
| --- | --- | --- | --- | --- | --- | --- | --- |
| First hard coat | Thickness μm | 2 | 2 | 2 | 2 | 2 | 2 |
|  | Predrying temperature ° C. | 80 | 80 | 80 | 80 | 80 | 80 |
|  | Predrying time minute | 1 | 1 | 1 | 1 | 1 | 1 |
|  | Preheating for irradiation ° C. | 60 | 60 | 60 | 60 | 60 | 60 |
|  | Integrated amount of light mJ/cm$^2$ | 480 | 480 | 480 | 480 | 480 | 480 |
| Second hard coat | Thickness μm | 25 | 35 | 22 | 22 | 22 | 22 |
|  | Predrying temperature ° C. | 90 | 90 | 90 | 90 | 90 | 90 |
|  | Predrying time minute | 1 | 1 | 1 | 1 | 1 | 1 |
|  | Preheating for irradiation ° C. | 90 | 90 | 90 | 90 | 90 | 90 |
|  | Integrated amount of light mJ/cm$^2$ | 80 | 80 | 30 | 80 | 120 | 160 |
| Evaluation results | Total light transmittance % | 89.5 | 89.0 | 89.9 | 89.9 | 89.9 | 89.9 |
|  | Haze % | 0.3 | 0.3 | 0.3 | 0.3 | 0.3 | 0.3 |
|  | Yellowness index | 0.3 | 0.3 | 0.3 | 0.3 | 0.3 | 0.3 |
|  | Water contact angle deg | 116 | 116 | 116 | 116 | 116 | 116 |
|  | Abrasion resistance 1 | A | A | A | A | A | A |
|  | Abrasion resistance 2 | A | A | A | A | A | A |
|  | Pencil hardness | 7H | 9H | 7H | 7H | 7H | 7H |
|  | Surface smoothness | ◎ | ◎ | ◎ | ◎ | ◎ | ◎ |
|  | Square lattice pattern test | Classification 0 | Classification 0 | Classification 0 | Classification 0 | Classification 0 | Classification 1 |
|  | Minimum bending radius mm | 35 | 70 | 30 | 30 | 30 | 30 |

TABLE 11-continued

|  | | Example 42 | Example 43 | Example 44 | Example 1 | Example 45 | Example 46 |
|---|---|---|---|---|---|---|---|
| | Cutting processability | ◎-◯ | ◎-◯ | ◎-◯ | ◎-◯ | ◎-◯ | ◎-◯ |
| | Shrinkage-starting temperature ° C. | 140 | 140 | 140 | 140 | 140 | 140 |
| | Air bleedability | ◯ | ◯ | ◯ | ◯ | ◯ | ◯ |
| | Heat cycle reliability | ◯ | ◯ | ◯ | ◯ | ◯ | ◯ |
| | Appearance sustainability at peeling | ◯ | ◯ | ◯ | ◯ | ◯ | ◯ |

TABLE 12

|  |  | Example 47 | Example 48 | Example 49 | Example 50 | Example 51 | Example 52 |
|---|---|---|---|---|---|---|---|
| First hard coat | Thickness μm | 2 | 2 | 2 | 2 | 2 | 2 |
| | Predrying temperature ° C. | 80 | 80 | 80 | 80 | 80 | 80 |
| | Predrying time minute | 1 | 1 | 1 | 1 | 1 | 1 |
| | Preheating for irradiation ° C. | 60 | 60 | 40 | 80 | 40 | 80 |
| | Integrated amount of light mJ/cm² | 480 | 480 | 480 | 480 | 480 | 480 |
| Second hard coat | Thickness μm | 22 | 22 | 22 | 22 | 22 | 22 |
| | Predrying temperature ° C. | 90 | 90 | 90 | 90 | 90 | 90 |
| | Predrying time minute | 1 | 1 | 1 | 1 | 1 | 1 |
| | Preheating for irradiation ° C. | 90 | 90 | 90 | 90 | 90 | 90 |
| | Integrated amount of light mJ/cm² | 230 | 300 | 80 | 80 | 120 | 120 |
| Evaluation results | Total light transmittance % | 89.9 | 89.9 | 89.9 | 89.9 | 89.9 | 89.9 |
| | Haze % | 0.3 | 0.3 | 0.3 | 0.3 | 0.3 | 0.3 |
| | Yellowness index | 0.3 | 0.3 | 0.3 | 0.3 | 0.3 | 0.3 |
| | Water contact angle deg | 116 | 116 | 110 | 116 | 110 | 116 |
| | Abrasion resistance 1 | A | A | A | A | A | A |
| | Abrasion resistance 2 | A | A | A | A | A | A |
| | Pencil hardness | 7H | 7H | 7H | 7H | 7H | 7H |
| | Surface smoothness | ◎ | ◎ | ◎ | ◎ | ◎ | ◎ |
| | Square lattice pattern test | Classification 3 | Classification 4 | Classification 0 | Classification 0 | Classification 1 | Classification 1 |
| | Minimum bending radius mm | 30 | 30 | 30 | 30 | 30 | 30 |
| | Cutting processability | ◎-◯ | ◎-◯ | ◎-◯ | ◎-◯ | ◎-◯ | ◎-◯ |
| | Shrinkage-starting temperature ° C. | 140 | 140 | 140 | 140 | 140 | 140 |
| | Air bleedability | ◯ | ◯ | ◯ | ◯ | ◯ | ◯ |
| | Heat cycle reliability | ◯ | ◯ | ◯ | ◯ | ◯ | ◯ |
| | Appearance sustainability at peeling | ◯ | ◯ | ◯ | ◯ | ◯ | ◯ |

TABLE 13

|  |  | Example 53 | Example 54 | Example 55 | Example 56 | Example 57 | Example 58 |
|---|---|---|---|---|---|---|---|
| First hard coat | Thickness μm | 2 | 2 | 2 | 2 | 2 | 2 |
| | Predrying temperature ° C. | 80 | 80 | 80 | 80 | 80 | 80 |
| | Predrying time minute | 1 | 1 | 1 | 1 | 1 | 1 |
| | Preheating for irradiation ° C. | 25 | 40 | 80 | 110 | 40 | 80 |
| | Integrated amount of light mJ/cm² | 480 | 480 | 480 | 480 | 480 | 480 |
| Second hard coat | Thickness μm | 22 | 22 | 22 | 22 | 22 | 22 |
| | Predrying temperature ° C. | 90 | 90 | 90 | 90 | 90 | 90 |
| | Predrying time minute | 1 | 1 | 1 | 1 | 1 | 1 |
| | Preheating for irradiation ° C. | 90 | 90 | 90 | 90 | 90 | 90 |
| | Integrated amount of light mJ/cm² | 160 | 160 | 160 | 160 | 230 | 230 |

TABLE 13-continued

|  |  | Example 53 | Example 54 | Example 55 | Example 56 | Example 57 | Example 58 |
|---|---|---|---|---|---|---|---|
| Evaluation results | Total light transmittance % | 89.9 | 89.9 | 89.9 | 89.9 | 89.9 | 89.9 |
|  | Haze % | 0.3 | 0.3 | 0.3 | 0.3 | 0.3 | 0.3 |
|  | Yellowness index | 0.3 | 0.3 | 0.3 | 0.3 | 0.3 | 0.3 |
|  | Water contact angle deg | 110 | 110 | 116 | 110 | 110 | 116 |
|  | Abrasion resistance 1 | A | A | A | A | A | A |
|  | Abrasion resistance 2 | A | A | A | A | A | A |
|  | Pencil hardness | 7H | 7H | 7H | 7H | 7H | 7H |
|  | Surface smoothness | ◎ | ◎ | ◎ | ◎ | ◎ | ◎ |
|  | Square lattice pattern test | Classification 5 | Classification 2 | Classification 2 | Classification 5 | Classification 3 | Classification 3 |
|  | Minimum bending radius mm | 30 | 30 | 30 | 30 | 30 | 30 |
|  | Cutting processability | ◎-○ | ◎-○ | ◎-○ | ◎-○ | ◎-○ | ◎-○ |
|  | Shrinkage-starting temperature ° C. | 140 | 140 | 140 | 140 | 140 | 140 |
|  | Air bleedability | ○ | ○ | ○ | ○ | ○ | ○ |
|  | Heat cycle reliability | ○ | ○ | ○ | ○ | ○ | ○ |
|  | Appearance sustainability at peeling | ○ | ○ | ○ | ○ | ○ | ○ |

These experimental results reveal that the pressure-sensitive adhesive film according to at least one embodiment is excellent in transparency, color tone, abrasion resistance, surface hardness, and surface appearance. Furthermore, the experimental results reveal that the pressure-sensitive adhesive film according to at least one embodiment is also excellent in air bleedability, heat cycle reliability, and appearance sustainability at peeling. Therefore, the pressure-sensitive adhesive film can be suitably used as a protective film for a display face plate of an image display apparatus having a touch panel function. Moreover, the pressure-sensitive adhesive film can be suitably used for a display face plate of an image display apparatus having a touch panel function.

REFERENCE SIGNS LIST

1: Ultraviolet irradiator
2: Mirror-finished metal roll
3: Web
4: Holding angle
5: First hard coat
6: Second hard coat
7: First poly(meth)acrylimide resin layer (α1)
8: Aromatic polycarbonate resin layer (β)
9: Second poly(meth)acrylimide resin layer (α2)
10: Third hard coat
11: Pressure-sensitive adhesive layer

The invention claimed is:

1. A pressure-sensitive adhesive film comprising, in order from a surface layer side, a first hard coat, a second hard coat, a transparent resin film layer, and a pressure-sensitive adhesive layer, wherein
the first hard coat is formed of a coating material containing a water-repelling agent and no inorganic particles,
the second hard coat is formed of a coating material containing inorganic particles, and
wherein the pressure-sensitive adhesive film satisfies the following requirements (i) and (vii):
(i) a total light transmittance of 85% or more; and
(vii) a pencil hardness of the first hard coat surface of 6H or more.

2. The pressure-sensitive adhesive film according to claim 1, wherein the pencil hardness of the first hard coat surface is 7H or more.

3. The pressure-sensitive adhesive film according to claim 2, wherein the pressure-sensitive adhesive film satisfies the following requirements (iv) and (v):
(iv) a water contact angle at the first hard coat surface of 100° or more; and
(v) a water contact angle at the first hard coat surface after 20,000 reciprocating wipes with a cotton of 100° or more.

4. The pressure-sensitive adhesive film according to claim 3, wherein the water-repelling agent comprises a (meth)acryloyl group-containing fluoropolyether water-repelling agent.

5. The pressure-sensitive adhesive film according to claim 3, wherein the first hard coat is formed of a coating material containing the water-repelling agent, a silane coupling agent and no inorganic particles.

6. The pressure-sensitive adhesive film according to claim 1, further satisfying the following requirements (iv) and (v):
(iv) a water contact angle at the first hard coat surface of 100° or more; and
(v) a water contact angle at the first hard coat surface after 20,000 reciprocating wipes with a cotton of 100° or more.

7. The pressure-sensitive adhesive film according to claim 1, wherein the first hard coat has a thickness of from 0.5 to 5 μm.

8. The pressure-sensitive adhesive film according to claim 1, wherein the second hard coat has a thickness of from 10 to 30 μm.

9. The pressure-sensitive adhesive film according to claim 1, wherein the transparent resin film is a transparent multilayer film obtained by laminating a first poly(meth)acrylimide resin layer (α1), an aromatic polycarbonate resin layer (β), and a second poly(meth)acrylimide resin layer (α2) directly in this order.

10. The pressure-sensitive adhesive film according to claim 1, wherein the pressure-sensitive adhesive layer comprises a silicone pressure-sensitive adhesive.

11. Use of the pressure-sensitive adhesive film according to claim 1 as an image display apparatus member.

12. An image display apparatus comprising the pressure-sensitive adhesive film according to claim 1.

13. The pressure-sensitive adhesive film according to claim 1, wherein the water-repelling agent comprises a (meth)acryloyl group-containing fluoropolyether water-repelling agent.

14. The pressure-sensitive adhesive film according to claim 1, wherein the first hard coat is formed of a coating material containing the water-repelling agent, a silane coupling agent and no inorganic particles.

15. A pressure-sensitive adhesive film comprising, in order from a surface layer side, a first hard coat, a second hard coat, a transparent resin film layer, and a pressure-sensitive adhesive layer, wherein
the first hard coat is formed of a coating material comprising:
  (A) 100 parts by mass of a polyfunctional (meth) acrylate;
  (B) 0.01 to 7 parts by mass of a water-repelling agent; and
  (C) 0.01 to 10 parts by mass of a silane coupling agent, containing no inorganic particles, and
the second hard coat is formed of a coating material comprising:
  (A) 100 parts by mass of a polyfunctional (meth) acrylate; and
  (D) 50 to 300 parts by mass of inorganic fine particles having an average particle size of 1 to 300 nm, and the pencil hardness of the first hard coat is 6H or more.

16. The pressure-sensitive adhesive film according to claim 15, wherein the (C) silane coupling agent comprises one or more selected from the group consisting of a silane coupling agent having an amino group and a silane coupling agent having a mercapto group.

17. The pressure-sensitive adhesive film according to claim 15, wherein the (B) water-repelling agent comprises a (meth)acryloyl group-containing fluoropolyether water-repelling agent.

18. The pressure-sensitive adhesive film according to claim 15, wherein the second hard coat forming coating material further comprises 0.01 to 1 part by mass of (E) a leveling agent.

19. The pressure-sensitive adhesive film according to claim 18, wherein the (E) leveling agent comprises a silicone-acrylate copolymer leveling agent.

20. The pressure-sensitive adhesive film according to claim 15, wherein the pencil hardness of the first hard coat surface is 7H or more.

* * * * *